(12) United States Patent
Mashimo et al.

(10) Patent No.: US 11,368,626 B2
(45) Date of Patent: Jun. 21, 2022

(54) DISPLAY CONTROL APPARATUS THAT CONTROLS DISPLAY OF INFORMATION RELATING TO BOKEH AND METHOD FOR CONTROLLING THE SAME

(71) Applicant: CANON KABUSHIKI KAISHA, Tokyo (JP)

(72) Inventors: Taiki Mashimo, Tokyo (JP); Takashi Kobayashi, Tokyo (JP); Takashi Seki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/167,867

(22) Filed: Feb. 4, 2021

(65) Prior Publication Data

US 2021/0250517 A1    Aug. 12, 2021

(30) Foreign Application Priority Data

Feb. 6, 2020 (JP) .............................. JP2020-019130
Nov. 13, 2020 (JP) .............................. JP2020-189786

(51) Int. Cl.
*H04N 5/222* (2006.01)
*H04N 5/232* (2006.01)
*H04N 5/225* (2006.01)

(52) U.S. Cl.
CPC ..... *H04N 5/232945* (2018.08); *H04N 5/2254* (2013.01)

(58) Field of Classification Search
CPC ................................................ H04N 5/232945
See application file for complete search history.

(56) References Cited

U.S. PATENT DOCUMENTS

| | | | |
|---|---|---|---|
| 2012/0268831 A1* | 10/2012 | Yamanashi | G02B 15/145511 359/686 |
| 2017/0148142 A1* | 5/2017 | Park | H04N 5/232933 |
| 2020/0082599 A1* | 3/2020 | Manzari | G06F 3/04847 |

FOREIGN PATENT DOCUMENTS

JP    2003-101835 A    4/2003

\* cited by examiner

*Primary Examiner* — Gary C Vieaux
(74) *Attorney, Agent, or Firm* — Cowan, Liebowitz & Latman, P.C.

(57) ABSTRACT

A display control apparatus, in which a user can easily recognize "taste of bokeh" of a captured image before the image is recorded, is disclosed. The display control apparatus controls so as to display, together with a first item that indicates either one of a setting value of an F-number or a T-number, a second item that indicates information that relates to an F-number and an amount of variance of a T-number that correspond to a current setting value.

15 Claims, 14 Drawing Sheets

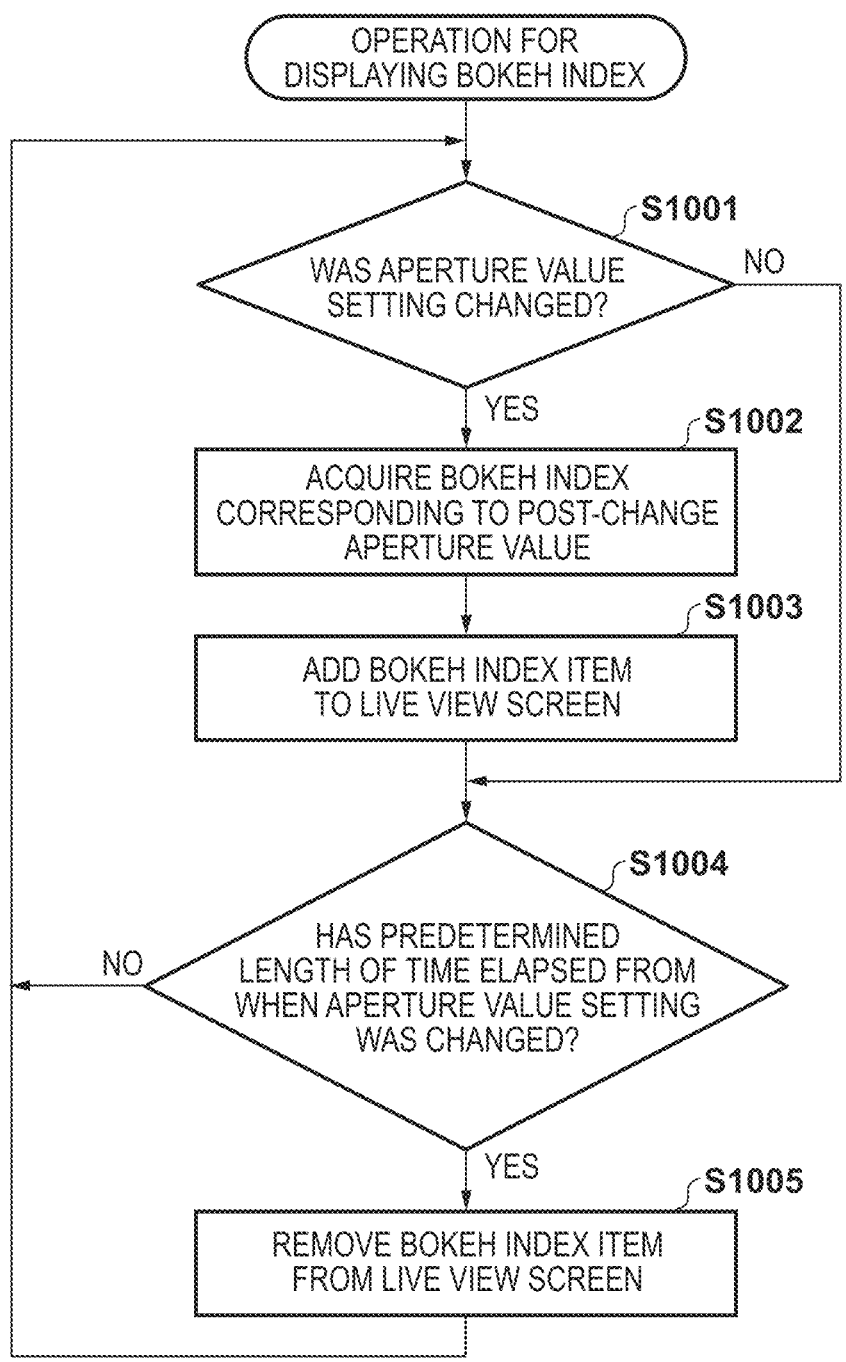

DISPLAY CONTROL APPARATUS THAT CONTROLS DISPLAY OF INFORMATION RELATING TO BOKEH AND METHOD FOR CONTROLLING THE SAME

BACKGROUND OF THE INVENTION

Field of the Invention

The present invention is related to a display control apparatus, an image capture apparatus, and methods for controlling the same and is related to a technique for displaying information related especially to shooting.

Description of the Related Art

An F-number and a T-number are known as indices for brightness of a shooting lens. The F-number is a value for when light transmittance of an optical element present within a light path is assumed to be 100%. Meanwhile, the T-number is a value in which actual light transmittance of an optical element present within a light path is reflected. In environments that require exact exposure control such as television and movie shoots, not only the F-number but also the T-number becomes important.

In Japanese Patent Laid-Open No. 2003-101835, displaying the F-number and the T-number, side by side, as lens unit information on a lens information display unit connected to the lens unit is disclosed.

In a shooting lens, a difference between the T-number and the F-number affects a blur quality (hereinafter, referred to as "taste of bokeh") of an out-of-focus-portion image (blurred image). However, similarly to Japanese Patent Laid-Open No. 2003-101835, in a case where the T-number and the F-number are displayed as they are, it is difficult to easily recognize a quality of "taste of bokeh" of a captured image.

SUMMARY OF THE INVENTION

The present invention, in its embodiments, provide a display control apparatus, in which a user can easily recognize "taste of bokeh" of a captured image before it is recorded, and a method for controlling the same.

According to an aspect of the present invention, there is provided a display control apparatus comprising: one or more processors, when executing a program stored, function as: a setting unit configured to be able to set at least a setting value of either one of an F-number, a T-number and a value relating to a focus distance; an acquisition unit configured to be able to acquire information that relates to a degree of bokeh that changes based on the setting value set by the setting unit; and a control unit configured to control so as to display the information corresponding to a current setting value acquired by the acquisition unit.

According to another aspect of the present invention, there is provided a method for controlling a display control apparatus, the method comprising: acquiring, by an acquisition unit, a bokeh index in a captured image based on a T-number that corresponds to a current F-number of a lens unit; and controlling, by a control unit, to cause a display, on a display unit, of an item that expresses the bokeh index.

According to a further aspect of the present invention, there is provided a non-transitory computer-readable storage medium storing a program for causing a computer to execute a method for controlling a display control apparatus, the method comprising: acquiring, by an acquisition unit, a bokeh index in a captured image based on a T-number that corresponds to a current F-number of a lens unit; and controlling, by a control unit, to cause a display, on a display unit, of an item that expresses the bokeh index.

According to another aspect of the present invention, there is provided an image capture apparatus comprising: a shooting unit configured to shoot an image; an acquisition unit configured to be able to acquire information of either an F-number or a T-number of a lens unit and information that relates to focus; a calculation unit configured to calculate a blur effect based on information acquired by the acquisition unit; and a display unit configured to display an image, wherein the apparatus is operable to shoot an image by the shooting unit, calculate the blur effect in each of regions of the shot image, and display in a superimposed manner on the shot image an item based on the blur effect.

According to a further aspect of the present invention, there is provided a method for controlling an image capture apparatus that has a shooting unit operable to shoot an image, the method comprising: acquiring information of either an F-number or a T-number of the lens unit and information that relates to focus: calculating, based on the acquired information, a blur effect in each region of an image shot by the shooting unit; and displaying in a superimposed manner on the shot image an item based on the calculated blur effect.

According to another aspect of the present invention, there is provided a non-transitory computer-readable storage medium storing a program for causing a computer to execute a control method or controlling an image capture apparatus that has a shooting unit operable to shoot an image, the method comprising: acquiring information of either an F-number or a T-number of the lens unit and information that relates to focus: calculating, based on the acquired information, a blur effect in each region of an image shot by the shooting unit; and displaying in a superimposed manner on the shot image an item based on the calculated blur effect.

Further features of the present invention will become apparent from the following description of exemplary embodiments (with reference to the attached drawings).

BRIEF DESCRIPTION OF THE DRAWINGS

FIG. 10 is a flowchart relating to control of a display of a bokeh index item in the second embodiment.

DESCRIPTION OF THE EMBODIMENTS

Embodiments of the present invention will be described hereinafter in detail, with reference to the accompanying drawings. Note that the following embodiments do not limit the invention recited in the claims. Although a plurality of features are described in the embodiments, not all of the features are essential for the invention, and the plurality of features may be combined in any way. Furthermore, in the accompanying drawings, the same or similar configurations are given the same reference signs, and redundant descriptions thereof will be omitted.

It is to be noted that the following exemplary embodiments are merely examples for implementing the present invention and any of the embodiments can be appropriately modified or changed depending on individual constructions and various conditions of apparatuses to which the present invention is applied. Thus, the present invention is in no way limited to the following exemplary embodiments.

Note that, in the following embodiment, a case where the present invention is implemented in a lens-interchangeable digital camera will be described. However, the present invention can be implemented in a desired electronic device that is capable of acquiring shooting lens information. Such an electronic device includes an electronic device comprising an image capture apparatus and an electronic device as an external apparatus that is capable of communicating with an image capture apparatus. More specifically, the present invention can be implemented in a digital video camera, a computer device (such as a personal computer, a tablet computer, a media player, and a PDA), a mobile telephone, a smart phone, a game device, a robot, a drone and the like. Note that these are examples of an electronic device in which the present invention can be implemented and is not something that prevents implementation in another electronic device.

First Embodiment

<Configuration of Digital Camera>

Figure 1:
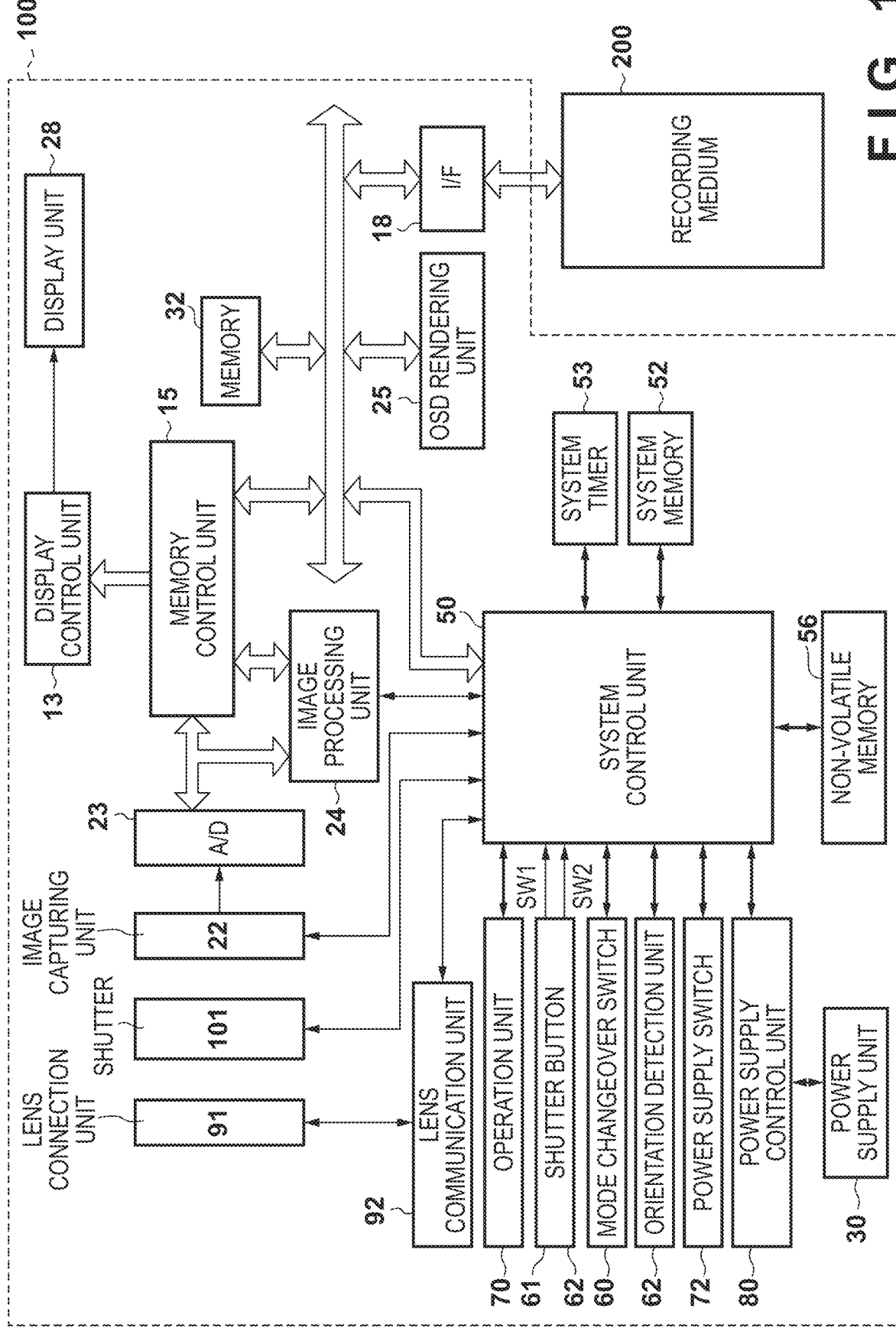
FIG. 1 is a block diagram illustrating an example of a functional configuration of a digital camera as an example of a display control apparatus according to an embodiment.

FIG. 1 is a block diagram illustrating an example of a functional configuration of a digital camera 100 (camera body) as an example of a display control apparatus according to the present embodiment. A shutter 101 is a focal plane shutter. An image capturing unit 22 is an image capturing element, in which a plurality of pixels are positioned two-dimensionally, for converting an optical image into a group of analog electrical signals and may be a CCD or a CMOS image sensor.

An A/D conversion unit 23 converts a group of analog electrical signals outputted from the image capturing unit 22 into a group of digital signals (image data). The A/D conversion unit 23 may be included in the image capturing unit 22.

An image processing unit 24, by applying preset image processing in relation to the image data supplied from the A/D conversion unit 23 or a memory control unit 15, generates signals and image data and acquires and/or generates various information. An image processing circuit 824 may be a dedicated hardware circuit such as an ASIC designed to realize a specific function, or may be configured to realize a specific function by a programmable processor such as a DSP executing software, for example.

Here, in the image processing applied by the image processing unit 24, preprocessing, color interpolation processing, correction processing, data processing, evaluation value calculation processing, special effect processing, and the like are included. The preprocessing includes signal amplification, reference level adjustment, defective pixel correction, and the like. The color interpolation processing is processing for interpolating values of color components that are not included in the image data read out from the pixels, and is also called de-mosaic processing or synchronization processing. The correction processing includes white balance adjustment, tone correction (gamma processing), processing for correcting optical aberration of an image capturing optical system or a limb darkening effect, processing for correcting a color, and the like. The data processing includes compositing processing, scaling processing, encoding and decoding processing, header information generation processing, and the like. The evaluation value calculation processing is processing for generating a signal or an evaluation value to use for auto focus detection (AF), for calculating an evaluation value to use for automatic exposure control (AE), and the like. The special effect processing includes blur addition, color tone change, relighting processing, and the like. Note that these are examples of image processing capable of being applied by the image processing unit 24 and is not something that limits image processing that is applied by the image processing unit 24.

The image data outputted by the A/D conversion unit 23 and the image processing unit 24 is stored in a memory 32 via the memory control unit 15. The memory 32 is used as a buffer memory for temporarily storing data that is currently being processed by the image processing unit 24. A part of the memory 32 is used as a video memory (VRAM) of a display unit 28. The memory 32 includes space for storing a predetermined number of still images and a predetermined length of time of moving images and audio.

An OSD rendering unit 25, in accordance with control of a system control unit 50, uses font data and icon data that are stored in a non-volatile memory 56 to generate image data for an on-screen display and then stores the result in a VRAM region within the memory 32. The image data generated by the OSD rendering unit 25 may be a GUI screen such as a menu screen, an image for indicating a state or a setting value of a digital camera 100, and a screen for guiding a user operation.

A display control unit 13 generates and then supplies to the display unit 28 a video signal based on image data for display that is stored in the VRAM region of the memory 32. The display unit 28 performs a display in accordance with the video signal from the display control unit 13 on a display device such as a liquid crystal display (LCD) and an organic electroluminescence display (OLED). The display unit 28 may be a touch display. Note that the display unit 28 may be an external apparatus connected so as to be able to communicate with the digital camera 100.

The display unit 28, by performing moving image shooting and then performing in sequence processing by the image processing unit 24 and the display control unit 13 for each frame, functions as an electronic view finder (EVF). An image displayed for causing the display unit 28 to function as an EVF is called a live view image or a through image.

The system control unit 50 is a CPU (also called an MPU or a microprocessor), for example. The system control unit 50, by deploying in a system memory 52 and then executing a program stored in the non-volatile memory 56, controls an operation of each unit of the digital camera 100 and realizes a function of the digital camera 100. Note that the system control unit 50 communicates with a lens control unit 301 that is included in a lens unit 300 via a lens communication unit 92 and controls an operation of the lens unit 300.

The non-volatile memory 56 is an electrically rewritable ROM (EEPROM) and stores a program executed by the system control unit 50, various setting values of the digital camera 100, and GUI data. The system memory 52 is a memory (RAM) that is used for deploying the programs executed by the system control unit 50 and for storing information that is required for executing the programs. Note that the memory 32 and the system memory 52 may be different regions within the same memory space.

A system timer 53 performs generation of a timing signal that is used for various control and measurement of time using a built-in clock.

A mode changeover switch 60, a first shutter switch (SW1) 61, a second shutter switch (SW2) 62, an operation unit 70, and a power supply switch 72 are input devices for the user to input an instruction into the digital camera 100. The first shutter switch (SW1) 61 and the second shutter switch (SW2) 62 are switches that are turned on by, respectively, half pressing a release button and fully pressing the release button. The system control unit 50 recognizes turning on of the first shutter switch (SW1) 61 as an instruction to prepare for shooting a still image and turning on of the second shutter switch (SW2) 62 as an instruction to start shooting a still image.

When the first shutter switch (SW1) 61 is turned on, the system control unit 50 performs AF processing. AE processing, AWB (auto white balance) processing, EF (pre-flash) processing, and the like as an operation to prepare for shooting and then waits for an instruction to start shooting.

When the second shutter switch (SW2) 62 is turned on, the system control unit 50 drives the shutter 101 in accordance with an exposure setting decided by the AE processing and then exposes the image capturing unit 22. Then, the system control unit 50 reads a group of analog signals from the image capturing unit 22, causes the image processing unit 24 to generate a still image data file for recording, and starts a series of operations for shooting processing until the file is recorded in a recording medium 200.

A plurality of input devices is included in the operation unit 70 and each has a name in accordance with an allotted function. For example, the operation unit 70 includes a menu button, a directional key, a deciding key, and the like. A plurality of functions may be allotted for the same input device. Also, the input device may be a software button/key using a touch panel. For example, when a menu button is pressed, a menu screen that is capable of performing various settings is displayed on the display unit 28. The user, by using the directional key and the deciding key to operate the menu screen that is displayed on the display unit 28, can input various settings and instructions into the digital camera 100. Note that an input device of a type in which instructions are inputted without contact such as voice input and line-of-sight input may be included in the operation unit 70.

The mode changeover switch 60 is a dial switch for switching a mode of operation of the digital camera 100. The mode of operation, although no limitation is made in particular, can be broadly divided into a still image recording mode, a moving image recording mode, and a playback mode, for example, and each mode can include a plurality of modes.

The power supply switch 72 switches on and off a power supply of the digital camera 100. In the present embodiment, when the power supply is turned on by the power supply switch 72, the digital camera 100 is assumed to enter a standby state for still image shooting. In such a state, the system control unit 50 continuously executes a control operation for causing the display unit 28 to function as an EVF.

A power supply control unit 80 is configured by a battery detection circuit, a DC-DC converter, a switch circuit for switching between blocks to be supplied, and the like, and detects whether or not a battery is attached, the type of the battery, and the remaining battery level. Based on the detection result and an instruction from the system control unit 50, the power supply control unit 80 controls the DC/DC converter and supplies a necessary voltage for a necessary period to each unit including the recording medium 200.

A power supply unit 30 is a primary battery, a secondary battery, an AC adapter, and the like. A recording medium I/F 18 is an interface for communicating with the recording medium 200. The recording medium 200 may be a memory card, a hard disk, and the like.

A lens connection unit 91 is a mechanism for attaching/detaching a lens unit and is also called a lens mount. The lens unit that is mechanically connected to the lens connection unit 91 is electrically connected to the digital camera 100 via a contact point arranged on the lens connection unit 91 and receives a supply of power from the digital camera 100 and communicates with the digital camera 100. The lens communication unit 92 is an interface for communicating with the lens unit.

The system control unit 50 communicates with the lens unit via the lens communication unit 92 and acquires information of the lens unit and provides an instruction for controlling an operation of the lens unit.

Figure 2A:
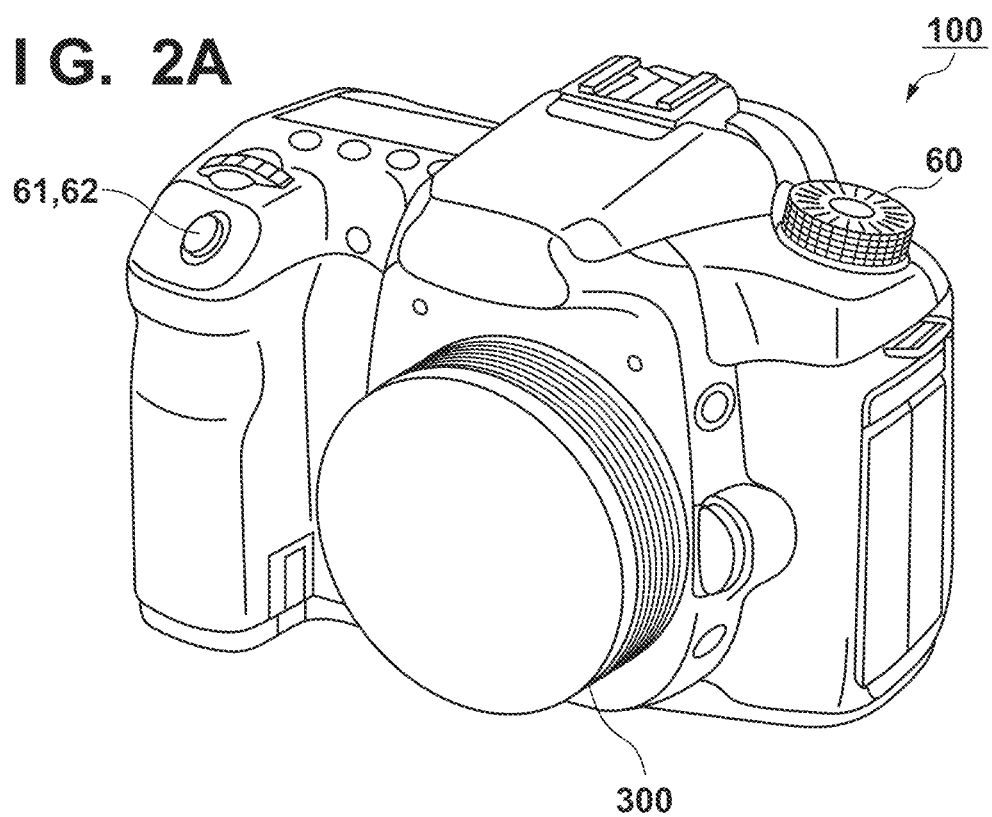
FIG. 2A and FIG. 2B are perspective views illustrating an example of an appearance of the digital camera in FIG. 1.
Figure 2B:
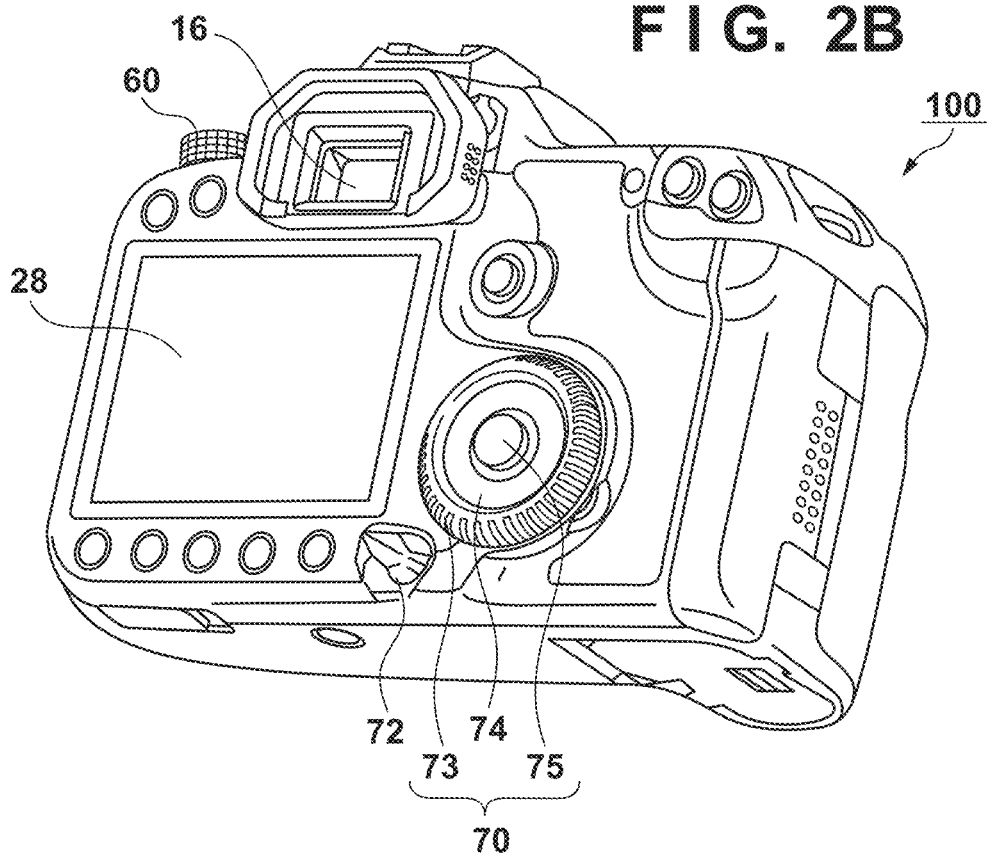

FIG. 2A and FIG. 2B are perspective views illustrating an example of an appearance of the digital camera 100 and the same reference numerals have been assigned to configuration elements that are the same as FIG. 1. FIG. 2A is a front perspective view and FIG. 2B is a rear perspective view. FIG. 2A and FIG. 2B illustrate a state in which the lens unit 300 is attached onto the lens connection unit 91.

A menu button 73, a directional key 74, and a deciding key 75 are input devices that are included in the operation unit 70. The directional key 74 is a four-directional key that can be pressed up, down, left, and right. The deciding key 75 is used mainly for instructing a decision of a selection item. The menu button 73 is used for providing an instruction for displaying a menu screen on the display unit 28. The user, via an operation of the menu screen, can perform confirmation and change of a current setting value of the digital camera 100.

A viewfinder 16 is an EVF including an in-viewfinder display unit within. The viewfinder 16 may be an optical viewfinder.

<Configuration of Lens Unit>

Figure 3:
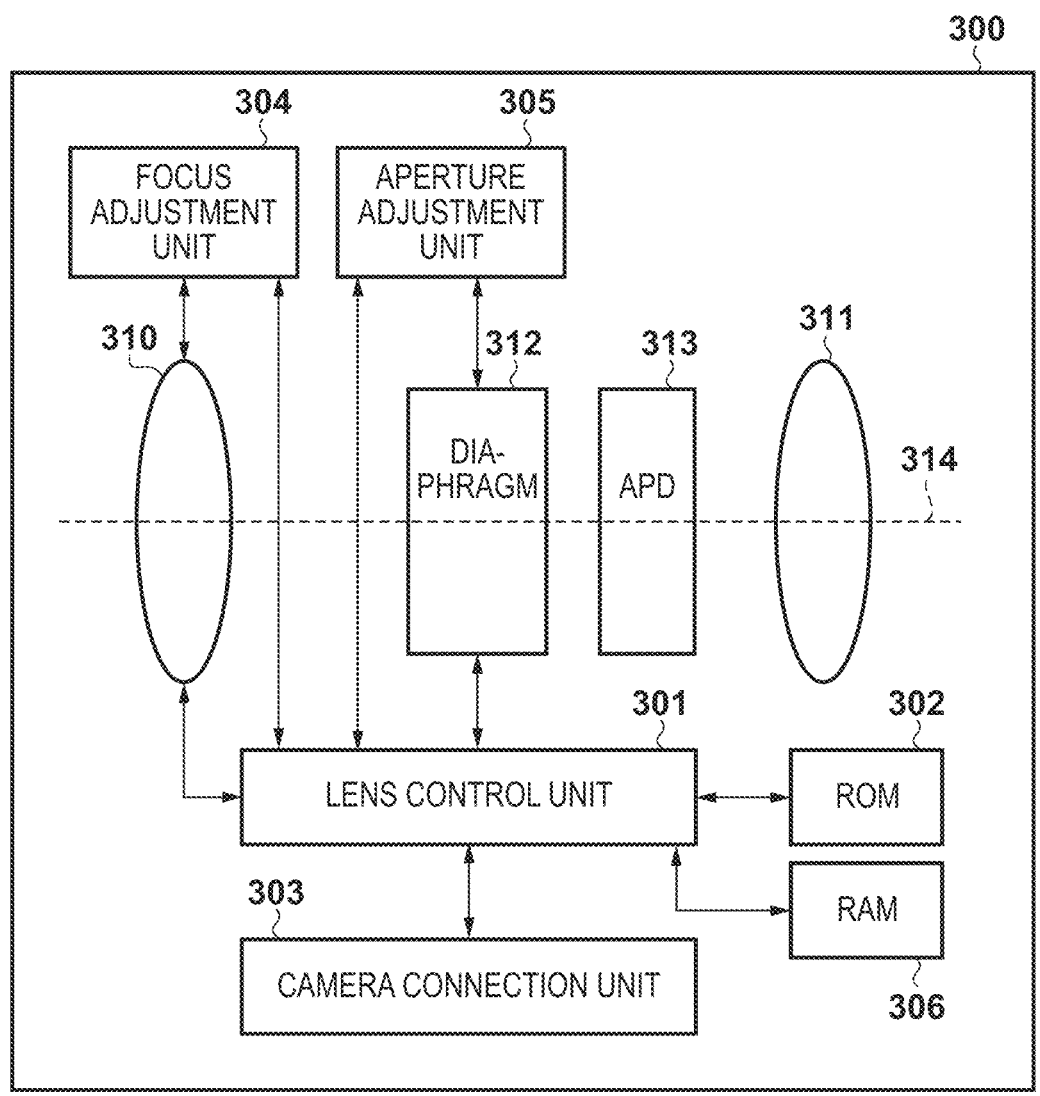
FIG. 3 is a block diagram illustrating an example of a functional configuration of a lens unit according to the embodiment.

FIG. 3 is a block diagram illustrating an example of a functional configuration of the lens unit 300 that is capable of connecting to the digital camera 100. The lens unit 300 is an image capturing optical system of the digital camera 100. The lens control unit 301 is a CPU, for example, and by deploying and then executing in a RAM 306 a program stored in a ROM 302, controls an operation of each unit of the lens unit 300.

A camera connection unit 303, by mechanically engaging with the lens connection unit 91 of the digital camera 100, connects the lens unit 300 to the digital camera 100. When the lens unit 300 is connected to the digital camera 100, contact points arranged respectively on the camera connection unit 303 and the lens connection unit 91 contact each other and the lens unit 300 and the digital camera 100 are electrically connected.

By this, the lens control unit 301 and the system control unit 50 can communicate with each other and in an operation for establishing connection, information that relates to the lens unit 300 is transmitted from the lens control unit 301 to the system control unit 50. The lens control unit 301, in accordance with an instruction from the system control unit 50, controls operations of a focus adjustment unit 304 and an aperture adjustment unit 305 and transmits to the system control unit 50 position information of focus lenses (front lens group 310), information of aperture value of a diaphragm 312, and the like.

The front lens group 310 and a rear lens group 311 are positioned on an optical axis 314 of the lens unit 300 and form an optical image of a subject on an image capturing plane of the image capturing unit 22. The focus adjustment unit 304 drives the front lens group 310 in a direction of the optical axis 314 and changes a focus distance of the lens unit 300. By this, a degree of focus of an image that is formed on the image capturing plane changes. The focus adjustment unit 304 is a motor, for example. The front lens group 310 is positioned further on a subject side than the diaphragm 312 and the rear lens group 311 is positioned further on the digital camera 100 side than the diaphragm 312. The position information of the front lens group 310 can be detected by the lens control unit 301.

The diaphragm 312 is positioned on the optical axis 314 and an aperture diameter is adjusted by the aperture adjustment unit 305. The aperture adjustment unit 305 is an actuator, for example. Note that the diaphragm 312 may be capable of being operated manually and in such a case, the aperture adjustment unit 305 includes an aperture ring operated by a user and a mechanism, which is linked with the aperture ring, for adjusting an aperture of the diaphragm, for example. Also, although the aperture adjustment unit 305 is configured to adjust the F-number here, the aperture adjustment unit 305 may adjust the T-number.

An APD 313 is also called an apodization filter or a smooth transfer focus and is an optical element whose transmittance changes in accordance with a distance from the optical axis. The APD 313 is positioned on the optical axis 314 between the diaphragm 312 and the rear lens group 311 here. The APD 313 can be said to be an optical element for modulating transmittance distribution, in a radial direction of the pupil, of a light beam that passes through a pupil of the lens unit 300. The APD 313 may be an optical element in which a film having an optical characteristic of modulating transmittance distribution in a radial direction of the pupil is arranged by vapor deposition on a surface of an optical glass. Note that instead of arranging the APD 313, a film having the same optical characteristic may be arranged by vapor deposition on some of the optical elements configuring the front lens group 310 and the rear lens group 311. Such a case corresponds to a configuration in which the lenses double as an APD. The APD 313, by smoothening a blurred image, has an effect of realizing a soft blurred image. Details will be described later.

Note that a driving amount and a driving direction of the front lens group 310, instead of being instructed by the system control unit 50 to the lens control unit 301, may be decided by the lens control unit 301. In such a case, a configuration may be taken so as to supply information for obtaining the defocus amount from the system control unit 50 to the lens control unit 301. Note that a portion of the front lens group 310 and a portion of the rear lens group 311 may function as focus lenses.

<Configuration and Characteristic of Apodization Filter>

Figure 4A:
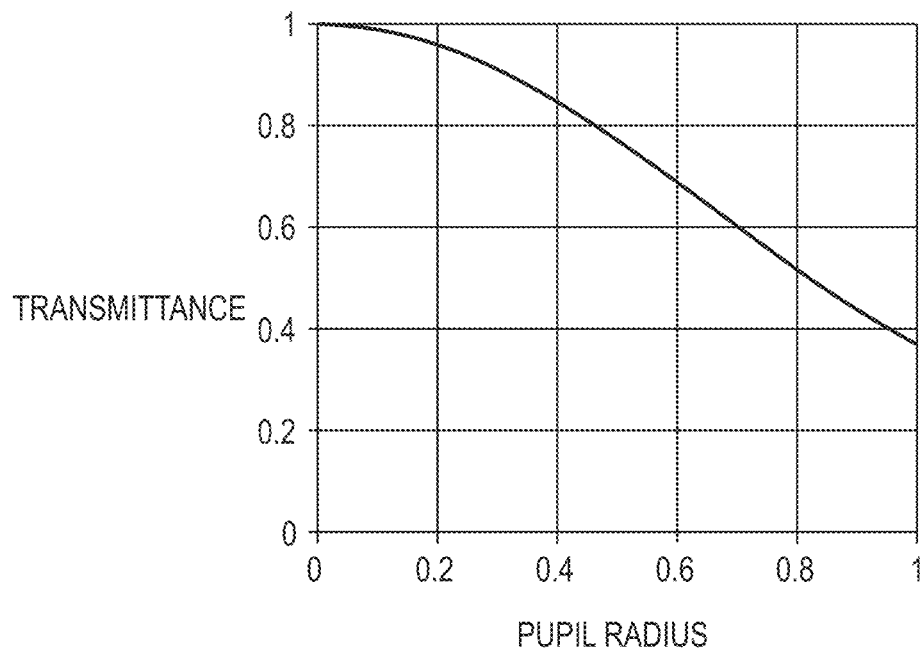
FIG. 4A and FIG. 4B are views illustrating an example of a transmittance characteristic of an APD in FIG. 3 and an example of a relationship between the F-number and the T-number.

Next, an optical characteristic of the APD 313 will be described. FIG. 4A is a view illustrating an example of a relationship (transmittance characteristic) between a normalized pupil radius and transmittance of the APD 313. The pupil radius is 0 at a point of intersection of the optical axis and the APD 313 and is 1 at the maximum pupil radius. Also, transmittance of 1 indicates 100%. In other words, FIG. 4A indicates that the APD 313 has an optical characteristic in which light transmittance decreases as a distance in the radial direction from the optical axis increases.

The characteristic indicated in FIG. 4A is expressed by the following Expression (1). In Expression (1), t is transmittance ($0 \leq t \leq 1$) and r is a normalized pupil radius ($0 \leq r \leq 1$).

$$t = \exp(-r^2/r_0^2) \quad (1)$$

Meanwhile, the F-number and the T-number have a relationship of Expression (2).

$$\sqrt{(I_0)} \cdot \sqrt{I} = F/T \quad (2)$$

Here, $I_0$ indicates transmittance ($0 \leq I_0 \leq 1$) of a lens group excluding the APD 313. Transmittance $I_0$ may be obtained by actual measurement or by simulation. Also, I is a ratio of amount of light in a case where there is no APD 313 and a case where there is the APD 313. The amount of light can be obtained by integrating Expression (1), for example. Specifically, I can be expressed by the following Expression (3).

$$I = \frac{1 - \exp\left(-\left(\frac{r}{r_0}\right)^2\right)}{\left(\frac{r}{r_0}\right)^2} = \frac{1 - \exp\left(-\left(\frac{F_0}{F}\right)^2\right)}{\left(\frac{F_0}{F}\right)^2} \quad (3)$$

Although an example in which a light amount ratio I is analytically obtained is given here, a configuration may be taken so as to actually measure the light amount ratio I for each F-number, for example, and associate the F-numbers and the light amount ratios I and hold the results in a table format in the ROM 302, for example.

Figure 4B:
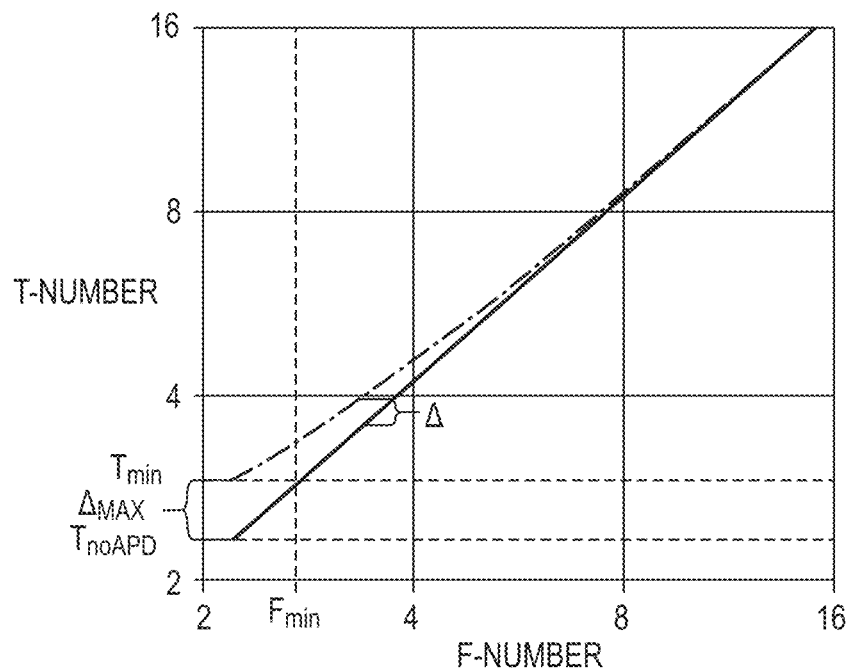

FIG. 4B illustrates an example of a relationship between the F-number and the T-number in a case where $I_0$ is 0.9. The F-number is indicated on a horizontal axis and the T-number is indicated on a vertical axis. $F_{min}$ indicates the minimum F-number (full-open F-number) of the lens unit 300 and is 2.2 in the present example. A dash-dotted line indicates a relationship of the F-number and the T-number when the APD 313 is positioned on the optical axis 314, and the T-number changes non-linearly in relation to a change in the F-number, especially in a range in which the F-number is small. This is because the effect of modulating transmittance in the radial direction by the APD 313 appears in the T-number in a region in which the F-number is small. Also, $T_{min}$ is the minimum T-number corresponding to the minimum F-number of 2.2 and is obtained by Expression (2).

Also, a solid line in FIG. 4B indicates a relationship between the F-number and the T-number in a case where there is no APD 313. In a case where there is no APD 313, the T-number changes linearly as expressed by the following Expression (4) in relation to a change in the F-number.

$$\sqrt{(I_0)} = F/T \quad (4)$$

Δ in FIG. 4B represents a difference or an amount of variance between the T-number obtained by Expression (4) and the T-number in a case where there is the APD 313, for the same F-number. A can be obtained by the following Expression (5) using Expression (4) and Expression (2).

$$\Delta = F/T' - F/T = \sqrt{(I_0)} - F/T \quad (5)$$

$T_{noAPD}$ in FIG. 4B indicates the T-number at the minimum F-number $F_{min}$ in a case where there is no APD 313. Also, $\Delta_{MAX}$ represents the maximum amount of variance in the T-number for the same F-number between the case where there is the APD 313 and the case where there is no APD 313, and is expressed by the following Expression (6).

$$\Delta_{MAX} = \sqrt{I_0} - \frac{F_{min}}{T_{noAPD}} \quad (6)$$

In a case where the APD 313 has a characteristic of modulating transmittance so that transmittance t monotonously decreases in relation to an increase in a pupil radius r as expressed by Expression (1), the T-number monotonously decreases in relation to an increase in the pupil radius r and A monotonously increases, based on Expression (2), Expression (3), and Expression (5). As described previously, the blur quality (taste of bokeh or degree of bokeh) of an out-of-focus-portion image (blurred image) is subjected to an effect of the difference between the T-number and the F-number. Since a magnitude of A has an effect on a magnitude of the difference between the T-number and the F-number, the magnitude of A can be used as an index of "taste of bokeh".

<Effect of Apodization Filter>

Figure 5A:
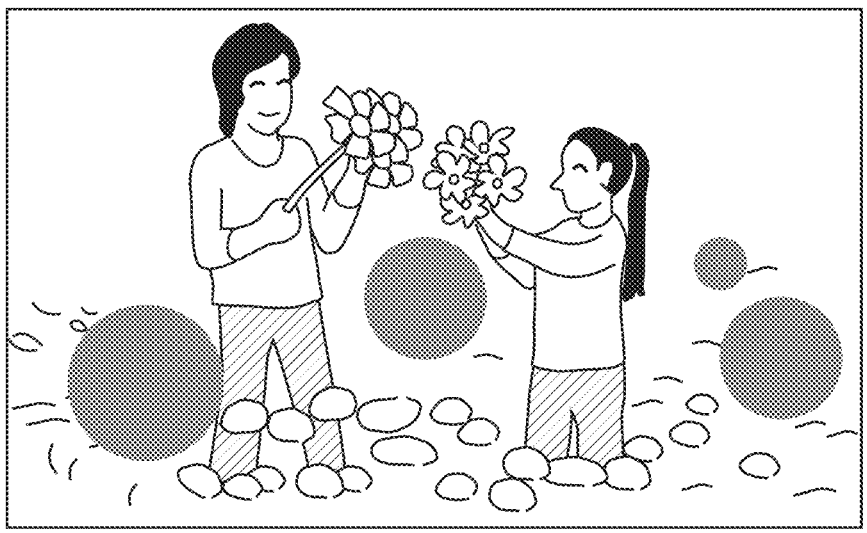
FIG. 5A to FIG. 5C are views schematically illustrating effects of the APD.
Figure 5B:
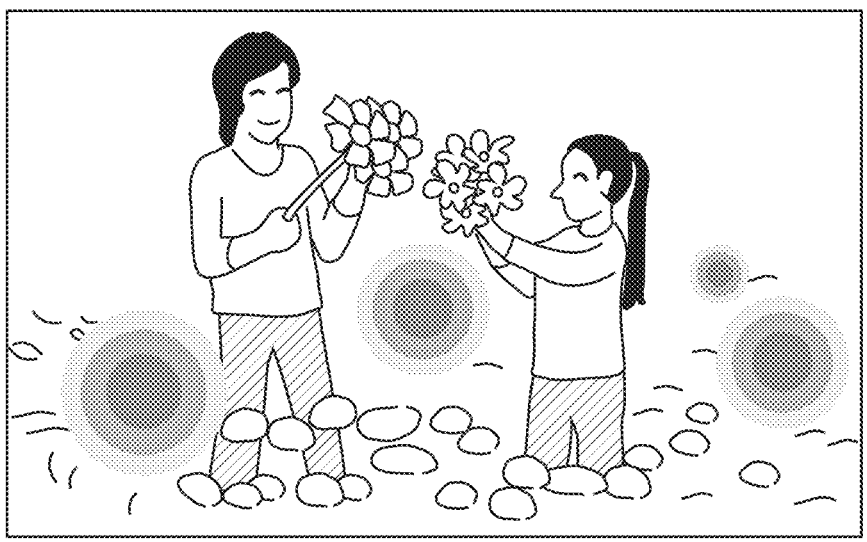
Figure 5C:
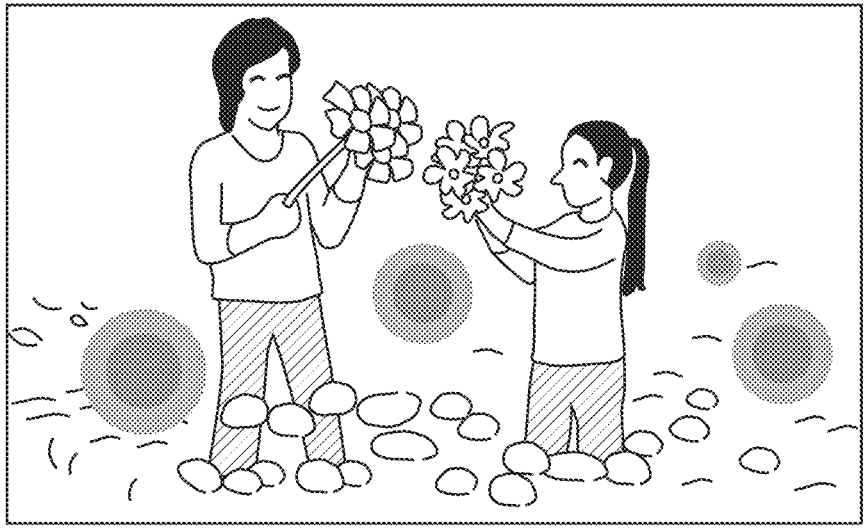

FIG. 5A to FIG. 5C are views schematically illustrating changes in blurred images, in other words, changes in "taste of bokeh", by the APD 313. FIG. 5A to FIG. 5C are images in which the same scene is shot, and they all include circular blurred images. Here, assume that FIG. 5A is an image which was shot in a state in which there was no APD 313. Also, FIG. 5B is an image which was shot with the APD 313 and in which an aperture value is full-open ($F_{min}$) and FIG. 5C is a schematic diagram of an image which was shot with the APD 313 and in which the aperture value is greater than full-open.

In the image in FIG. 5B in which an effect of the APD 313 is the greatest, insides and outlines of the circular blurred images become smoother, and soft blurred images are obtained. When the F-number is increased, a pupil of the image capturing optical system becomes smaller and a decrease in light transmittance by the APD 313 is prevented, and therefore outlines of blurred images become clear.

Figure 6:
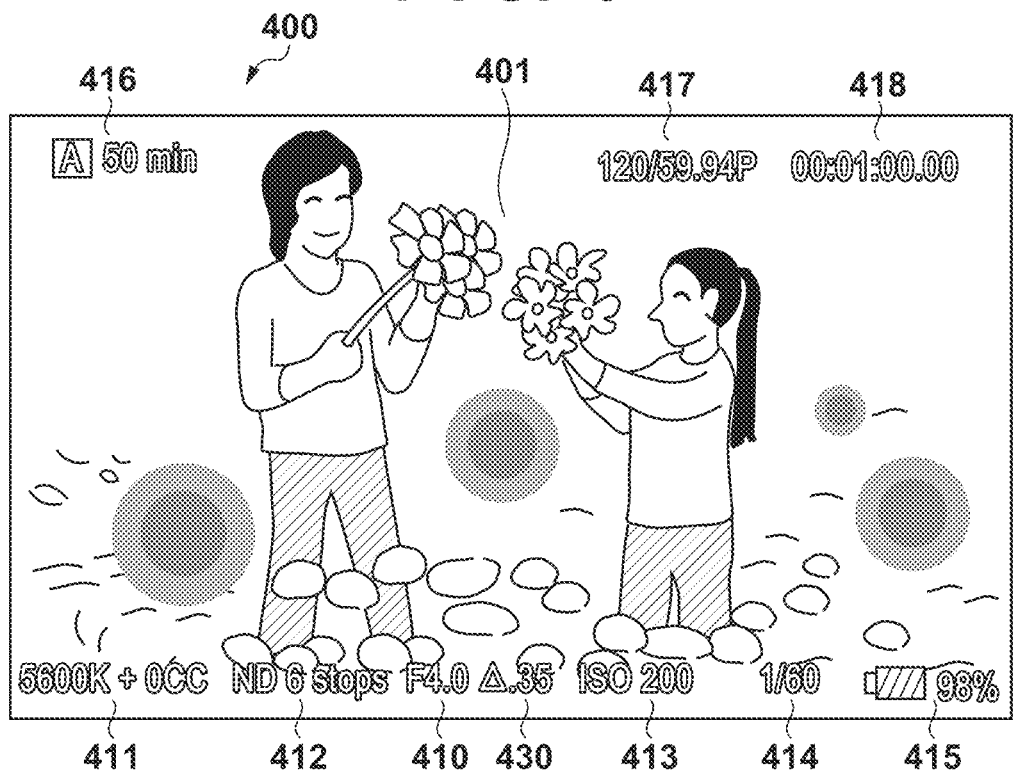
FIG. 6 is a view illustrating an example of a live view screen in a first embodiment.

FIG. 6 is a view illustrating an example of a live view screen that is displayed on the display unit 28 of the digital camera 100 when the lens unit 300 having the APD 313 is attached.

A live view screen 400 is an image in which a captured image 401 which was captured by the image capturing unit 22 and an image of image capturing auxiliary information are combined. Here, items 410 to 418 and 430 are exemplified as the image of image capturing auxiliary information. An F-number information item 410 indicates a currently set F-number. A WB item 411 indicates a currently set white balance. An ND item 412 indicates a number of stages of a currently used ND filter. An ISO item 413 indicates a currently set image capturing sensitivity. A shutter item 414 indicates a currently set shutter speed. A power item 415 indicates a currently remaining battery. A media information item 416 indicates a remaining capacity of a recording medium and to which slot the recording medium that is used for recording is attached. A frame rate item 417 and a time code item 418 indicate a frame rate and a time code of a moving image. Also, a bokeh index item 430 indicates a degree of an effect of the APD 313 that is related to blurred images (degree of smoothness of blurred images) on a current image capturing setting.

In FIG. 6, the bokeh index item 430 indicates in a numerical value, as a bokeh index, a ratio or a proportion of Δ corresponding to a current F-number to $\Delta_{MAX}$, which was described in FIG. 4B. An effect related to blurred images by the APD 313 is the greatest at $\Delta = \Delta_{MAX}$, and the blurred images becomes the smoothest. Accordingly, a bokeh index value that is calculated as a ratio of the two ($0 \leq \Delta/\Delta_{MAX} \leq 1$) is an index of a degree of an effect related to blurred images (smoothness of blurred images) by the APD 313, and when the bokeh index is 1, the effect is the greatest and when it is 0, there is no effect. Note that although the bokeh index item 430 is displayed as a value of Δ for convenience of displaying on a screen in FIG. 6, the displayed value is $\Delta/\Delta_{MAX}$.

Figure 7:
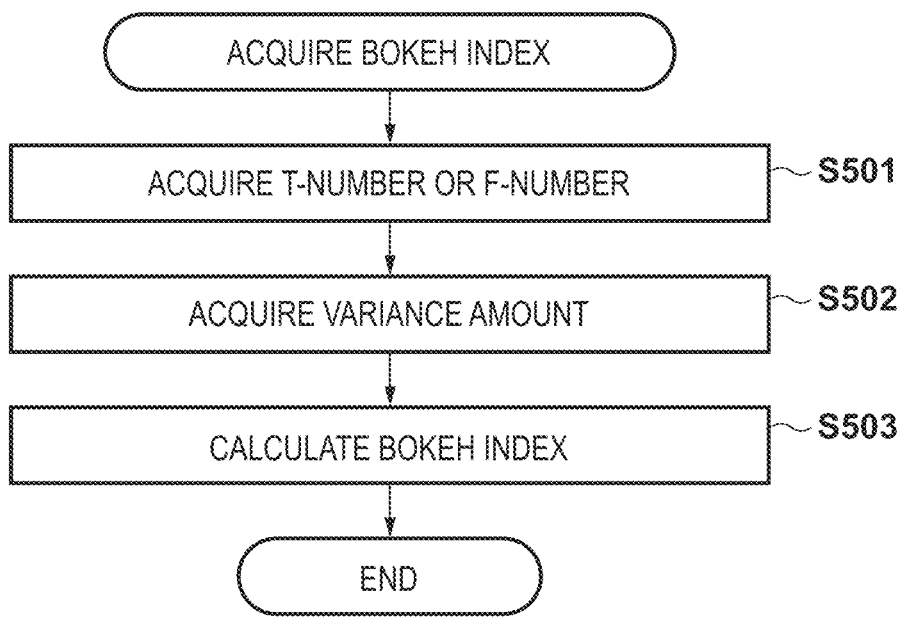
FIG. 7 is a flowchart relating to an operation for acquiring a bokeh index in the first embodiment.

FIG. 7 is a flowchart relating to an operation, which is executed by the digital camera 100, for calculating a bokeh index. An operation that is indicated in the flowchart in FIG. 7 is realized by a program that is stored in the non-volatile memory 56 being deployed in the system memory 52 and then executed by the system control unit 50. Note that this processing can be executed as part of an operation for a live view display in the digital camera 100.

In step S501, the system control unit 50 acquires at least one of a current F-number and T-number. The system control unit 50 can acquire by querying the lens control unit 301 for the current F-number (T-number), for example. The system control unit 50 stores in the system memory 52 the acquired current F-number (T-number). Note that a configuration may be taken so that the lens control unit 301 actively transmits the current F-number (T-number) to the system control unit 50 via the camera connection unit 303 and the system control unit 50 continuously updates the current F-number (T-number) that is stored in the system memory 52. Note that in a case where the system control unit 50 performs control of the diaphragm 312 of the lens unit 300, the system control unit 50 can acquire the current F-number by referencing the most recently set aperture value stored in the system memory 52, for example. In such a case, the system control unit 50 does not need to communicate with the lens control unit 301.

In step S502, the system control unit 50 acquires an amount of variance A in the T-number for the current F-number of the lens unit 300. The amount of variance A can be acquired by various methods. For example, information (e.g., table) in which a value of variance A in the T-number is associated with each F-number (T-number) is registered in the ROM 302 of the lens unit 300. Then, the system control unit 50, at a certain timing (e.g., immediately after the lens unit 300 is connected and then communication with the lens control unit 301 is established), acquires that table from the lens unit 300 and then stores it in the system memory 52. In step S502, the system control unit 50 can reference the table within the system memory 52 based on the F-number (T-number) acquired in step S501 and then acquire the amount of variance A.

Alternatively, the amount of variance A may be acquired from the system control unit 50 by querying the lens control unit 301. In such a case, the lens control unit 301 acquires the amount of variance Δ by referencing based on the current F-number (T-number) the table registered in the ROM 302 and then transmits it to the system control unit 50.

In a case of a configuration in which the current F-number (T-number) is transmitted from the lens control unit 301 to the system control unit 50 in step S501, a configuration may be taken so as to also transmit the amount of variance Δ corresponding to the current F-number (T-number). By this, the number of communications between the system control unit 50 and the lens control unit 301 can be reduced.

Note that the system control unit 50 may associate with identification information of the lens unit and then save in the non-volatile memory 56 unique information of the lens unit 300 acquired from the lens unit 300 such as information in which the value of variance A in the T-number is associated with each F-number (T-number). By this, in a case where the same lens unit is reconnected, there will be no need to reacquire unique information from the lens unit 300.

In step S503, the system control unit 50 calculates the bokeh index $\Delta/\Delta_{MAX}$. Note that in a case where the amount of variance A acquired in step S502 is used directly as a bokeh index, step S503 may not necessarily be executed. By setting the bokeh index to $\Delta/\Delta_{MAX}$, a bokeh index in which a state in which the greatest effect is obtained is set as 1 is obtained and it becomes easier to recognize a magnitude of an effect.

Then, based on the acquired bokeh index, the system control unit 50 causes the image processing unit 24 to generate an image of image capturing auxiliary information which includes an image of a bokeh index 430. The image of image capturing auxiliary information is stored in the VRAM region of the memory 32, is combined with a captured image for display, and then is displayed on the display unit 28 by the display control unit 13.

As described above, in the present embodiment, a configuration is taken so as to present, based on a difference, due to a presence/absence of an optical element for modulating light transmittance, between the T-numbers corresponding to the same F-number, an index indicating smoothness of blurred images in a captured image to be obtained by a capturing condition. Accordingly, the user can easily recognize the smoothness of blurred images obtained by the current setting before shooting and change the setting as needed. Accordingly, the user can easily shoot an image having a desired "taste of bokeh".

Second Embodiment

Next, a second embodiment will be described. In the first embodiment, an index based on the amount of variance A in the T-number was used as an index for indicating smoothness of blurred images. However, another index may be used. The present embodiment may be the same as the first embodiment except for the bokeh index and the method for presenting the bokeh index item 430, and therefore description regarding a configuration and an operation of an apparatus common to those of the first embodiment will be omitted.

Figure 8A:
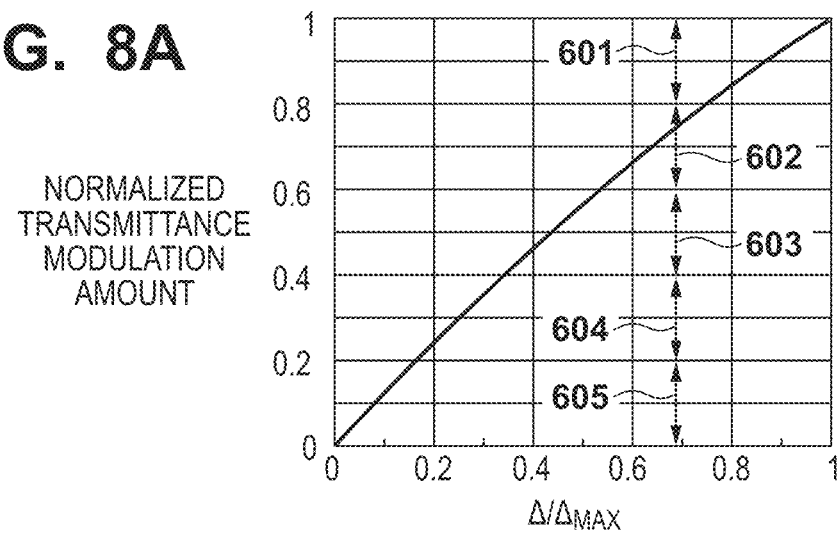
FIG. 8A to FIG. 8C are views illustrating a bokeh index used in a second embodiment and an example of a display.

FIG. 8A is a view illustrating an example of a relationship between $\Delta/\Delta_{MAX}$ and a normalized transmittance modulation amount. The normalized transmittance modulation amount includes values from 0 to 1 and is a value in which light transmittance according to a magnitude (radius r) of a pupil region of an image capturing optical system was normalized by light transmittance of when a magnitude of the pupil region is the greatest (radius $r_0$).

As illustrated in FIG. 8A, the normalized transmittance modulation amount and $\Delta/\Delta_{MAX}$ are in an association relationship, and therefore, the normalized transmittance modulation amount can be used as an index for indicating smoothness of blurred images. When using the normalized transmittance modulation amount as an index for indicating smoothness of blurred images, there is an effect of being able to recognize an effect (smoothness of blurred images) by the APD as an amount of change in a luminance value.

Also, the effect (smoothness of blurred images) by the APD may be represented by a plurality of ranks. In an example in FIG. 8A, values of the normalized transmittance modulation amount is divided into five ranks at every 0.2 units as indicated below.

A range 601 which is greater than 0.8 and equal to or less than 1: Level A

Figure 8B:
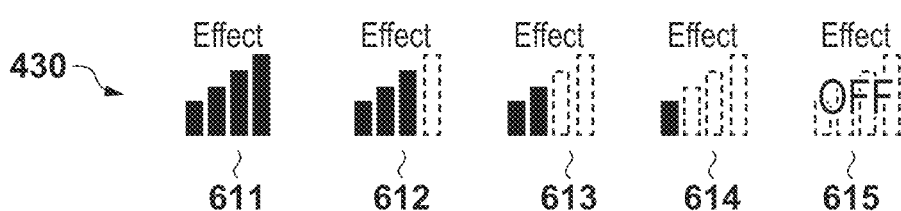
Figure 8C:
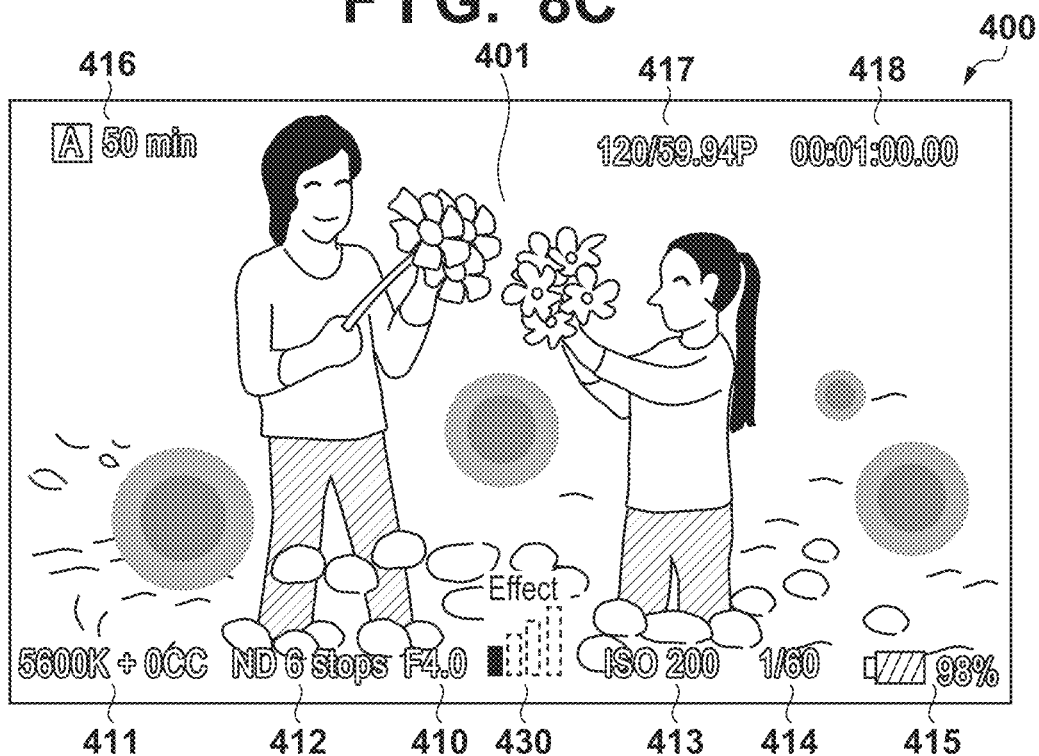

A range 602 which is greater than 0.6 and equal to or less than 0.8: Level B A range 603 which is greater than 0.4 and equal to or less than 0.6: Level C A range 604 which is greater than 0.2 and equal to or less than 0.4: Level D A range 605 which is equal to or less than 0.2 and greater than or equal to 0: Level E Also, the system control unit 50 causes the display unit 28 to display an image corresponding to each level as the bokeh index item 430. FIG. 8B and FIG. 8C illustrate, respectively, examples of the bokeh index item 430 corresponding to each level and an example of the bokeh index item 430 displayed on a live view. In FIG. 8C, regarding configurations that are common to the first embodiment, the same reference numerals as FIG. 6 will be added and description will be omitted.

In an example illustrated in FIG. 8B, levels are represented using bar-shaped patterns whose number is equal to the number of levels (number of ranks) minus 1. Reference numerals 611 to 615 in FIG. 8B are examples of the bokeh index item 430 corresponding respectively to the level A to the level E. In the level E whose effect is the least, the bar-shaped patterns are not displayed and text "OFF" is displayed instead. In the level D to the level A, the number of displayed bar-shaped patterns increases as the level increases, and in the highest level, the level A, all patterns are displayed. Note that in an example illustrated in FIG. 8B, lengths of bar-shaped patterns are varied so as to display in sequence from the shortest and represent the magnitude of levels not only through the number of displayed patterns but also the length. Note that, a configuration may be taken so as to display only outlines of undisplayed patterns so that the total number of bar-shaped patterns is known.

In the present embodiment, since the blur effect index is presented in a stepwise representation, in comparison to the first embodiment in which it is presented in a numerical representation, there is an advantage that a magnitude of an effect is easier to recognize immediately. Note that although a range of values of the normalized transmittance modulation amount were divided into five ranks in the example in FIG. 8B, a configuration may be taken so as to express in two ranks in which the level E is a rank without an effect and other ranks are ranks with an effect. It is effective in a case where the user desires only to know a presence/absence of an effect.

The number of ranks of the normalized transmittance modulation amount may be a predecided value or may be so that the user can set it from the menu screen (an integer greater than or equal to two). Note that a configuration may be taken so that a range of $\Delta/\Delta_{MAX}$ is divided into ranks instead of the normalized transmittance modulation amount and then presented as in the present embodiment.

Also, a configuration may be taken so that the transmittance modulation amount is set to a logarithm considering human visual recognition and then divided into ranks. Further, although an example in which a number of patterns to display was varied in accordance with ranks to express levels was indicated in the present embodiment, a configuration may be taken so as to employ a presentation method for expressing levels using another expression such as color tone, gray tone, and size of items.

Third Embodiment

Next, a third embodiment will be described. The present embodiment may be the same as the first embodiment except for the method for presenting the bokeh index item 430, and therefore description regarding a configuration and an operation of an apparatus common to those of the first embodiment will be omitted.

Figure 9A:
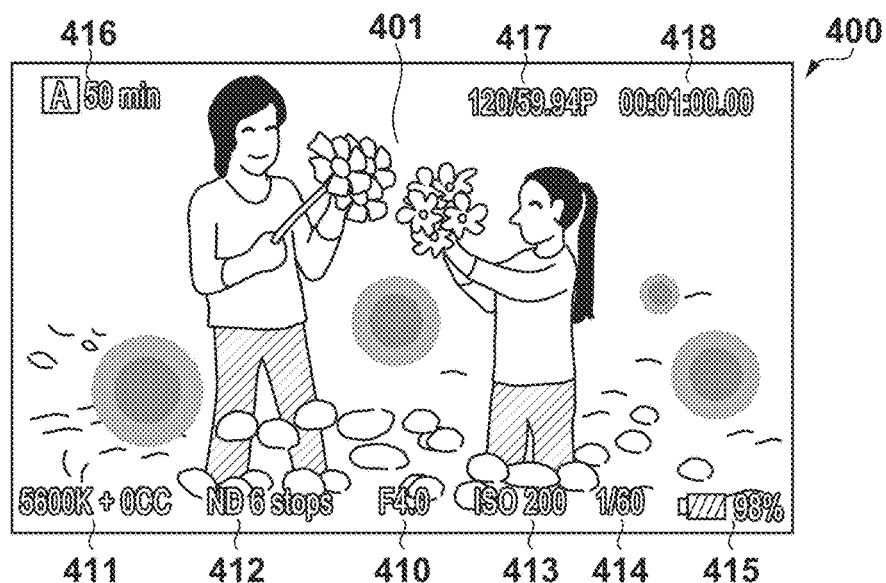
FIG. 9A to FIG. 9C are views schematically illustrating control for displaying a bokeh index item in a third embodiment.
Figure 9B:
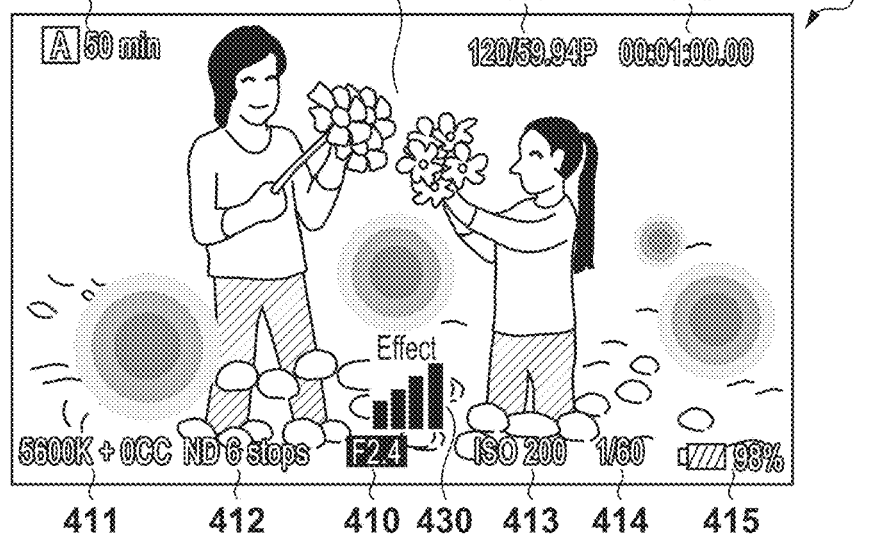
Figure 9C:
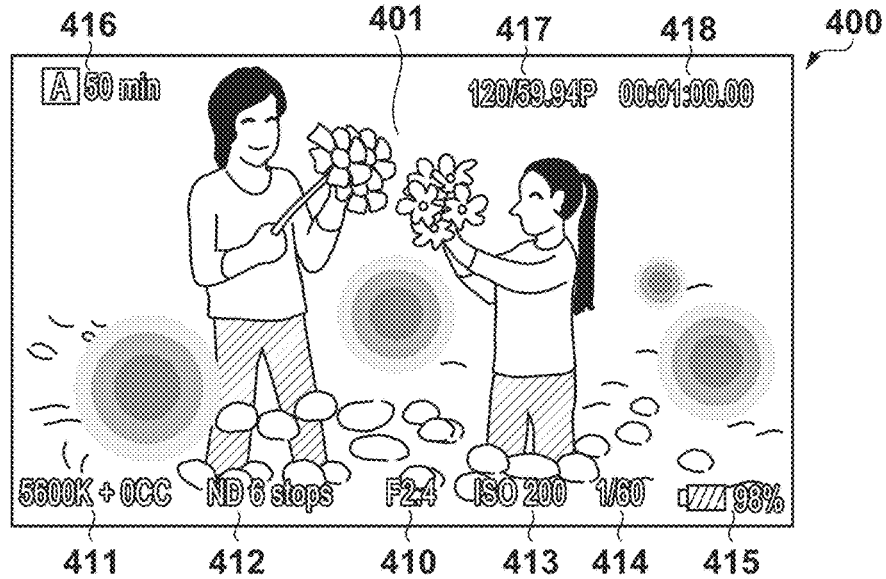

FIG. 9A to FIG. 9C are views schematically illustrating control for displaying the bokeh index item 430 in the embodiment. Configurations that are the same as in FIG. 6 will be given the same reference numerals and redundant descriptions are omitted. Also, FIG. 10 is a flowchart relating to an operation for controlling a display of the bokeh index item 430 in the present embodiment. An operation that is indicated in the flowchart in FIG. 10 is realized by a program that is stored in the non-volatile memory 56 being deployed in the system memory 52 and then executed by the system control unit 50. Note that this processing can be executed as part of an operation for a live view display in the digital camera 100.

FIG. 9A illustrates an example of a display of the live view screen 400 in a state in which the digital camera 100 is powered on and is in a capturing standby state. The capturing standby state is a state in which the digital camera 100 is powered on, start processing and the like are ended, and an operation from the user can be received. The system control unit 50, when the capturing standby state is entered, continuously implements moving image shooting and display operations and waits for an instruction from the user while functioning the display unit 28 as the EVF. In the present embodiment, the bokeh index item 430 is not displayed on the live view screen 400 during a period from when power is turned on until a user instruction to cause a change in a setting of the aperture value is first provided.

In step S1001, the system control unit 50 determines whether or not an operation for changing the setting of the aperture value was performed. The system control unit 50, if it determines that the operation for changing the setting of the aperture value was performed, executes step S1002 and if it does not determine that the operation for changing the setting of the aperture value was performed, executes step S1004. Here, the operation for changing the setting of the aperture value may be an operation of an aperture adjustment unit (e.g., aperture ring) 305 in the lens unit 300 or an operation for changing the aperture value related to the operation unit 70.

In step S1002, the system control unit acquires a bokeh index corresponding to a post-change aperture value (F-number or T-number). Here, the acquired bokeh index may be any of the blur indices described in the previous embodiments.

Also, in step S1003, the system control unit 50 controls the image processing unit 24 so as to display on the display unit 28 the bokeh index item 430 corresponding to the bokeh index acquired in step S1002. Here, the acquired bokeh index may be any of the bokeh index items described in the previous embodiments. FIG. 9B illustrates a state in which the bokeh index item 430 of an aspect described in the second embodiment was added to the live view screen 400. In the example in FIG. 9B, a display of the F-number information item 410 is reversed so as to emphasize on the live view screen 400 that the aperture value has been changed. Also, in the example in FIG. 9B, it is indicated that smoothness of blurred images has increased due to a change to the F-number (F2.4) that is smaller than a state (F4) in FIG. 9A.

In step S1004, the system control unit 50 determines whether or not a predetermined length of time (e.g., approximately 3 seconds to 5 seconds; here, 4 seconds) has elapsed from when a change in the setting of the aperture value was detected in step S1001. The system control unit 50 can determine whether or not the predetermined length of time has elapsed by using the system timer 53, for example. The system control unit 50, if it determines that the predetermined length of time has elapsed, executes step S1005 and if it determines that the predetermined length of time has not elapsed, executes step S1001 again.

In step S1005, the system control unit 50 hides the bokeh index item 430 from the display unit 28 (stops a display of the bokeh index item 430). FIG. 9C illustrates an example of the live view screen 400 in which the bokeh index item 430 is no longer displayed because the predetermined length of time from when the aperture value was changed is determined to have elapsed. Also, the F-number information item 410 which was reversed in FIG. 9B has returned to a normal display.

In steps S1004 and S1005, displaying/hiding of the bokeh index item is controlled according to a change in the setting of the aperture value and elapsed time from the change in the setting. However, because blurred images change in accordance with a focus distance, a configuration may be taken so as to control displaying/hiding of the bokeh index in accordance with an operation for changing the focus distance and elapsed time from the operation, similarly to the change of setting of the aperture value. The operation for changing the focus distance may be a manual focus operation or an operation for changing a focus detection region, for example.

By virtue of the present embodiment, a configuration was taken so as to display for a certain period of time the bokeh index item 430 when the user performs an operation for changing the aperture value or an operation for changing the focus distance. Accordingly, it is possible to improve visibility of the live view screen while informing the user of the smoothness of blurred images at an appropriate timing.

Fourth Embodiment

Next, a fourth embodiment will be described. The present embodiment may be the same as the first embodiment except for the method for presenting the bokeh index item 430, and therefore description regarding a configuration and an operation of an apparatus common to those of the first embodiment will be omitted.

From the first embodiment to the third embodiment, it was assumed that the lens unit 300 connected to the digital camera 100 had the APD 313 (optical element for modulating light transmittance). However, a lens unit not having an APD may be connected to the digital camera 100. Accordingly, in the present embodiment, whether or not to display the bokeh index item 430 on the display unit 28 is controlled in accordance with whether or not the connected lens unit 300 has an optical element for modulating light transmittance.

Figure 11:
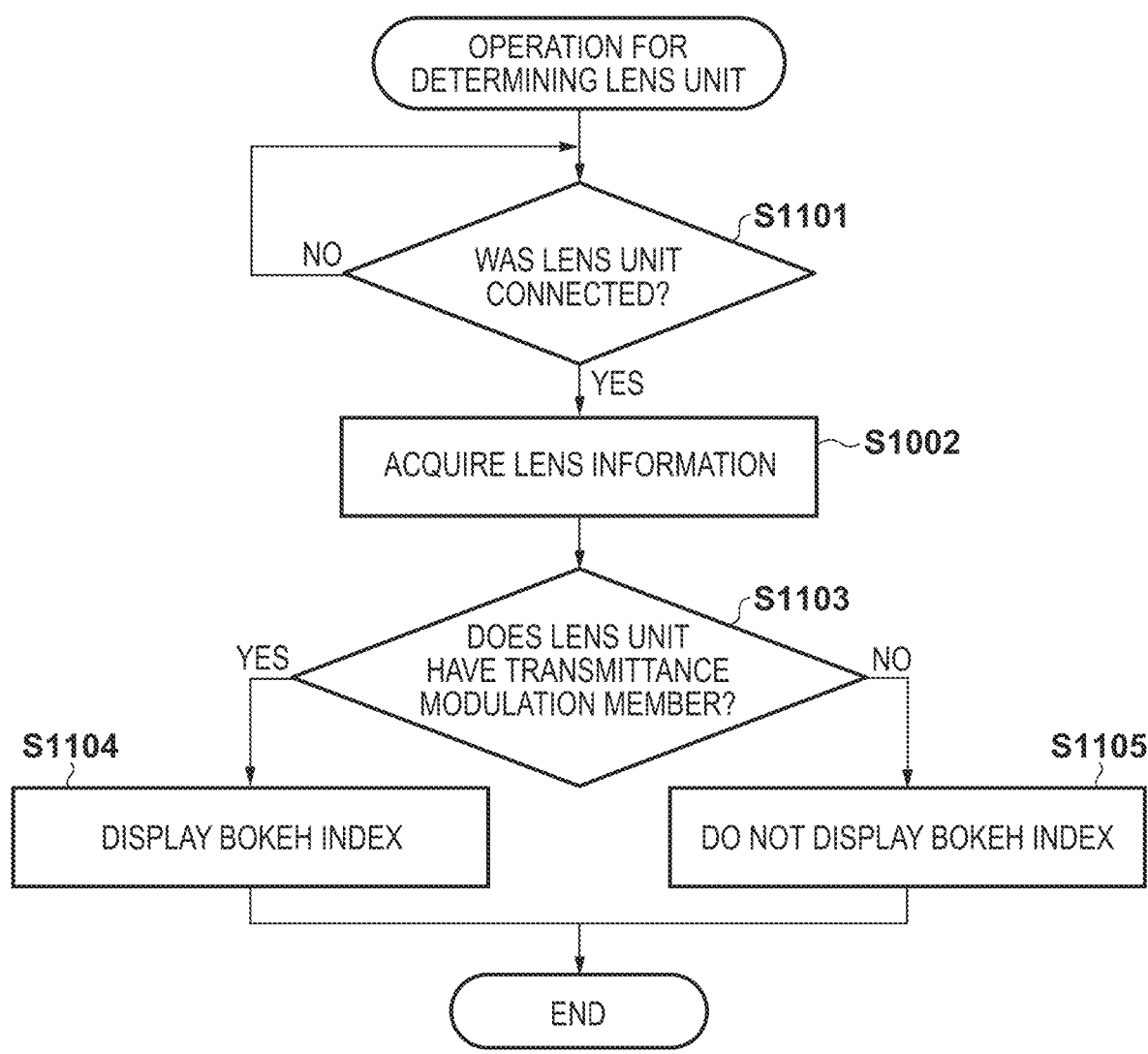
FIG. 11 is a flowchart relating to an operation for determining a lens unit in the third embodiment.

FIG. 11 is a flowchart relating to an operation for determining a lens unit in the present embodiment. An operation that is indicated in the flowchart in FIG. 11 is realized by a program that is stored in the non-volatile memory 56 being deployed in the system memory 52 and then executed by the system control unit 50. Note that this processing can be executed when the digital camera 100 is powered on or periodically be executed in a state in which the lens unit 300 is attachable/detachable.

In step S1101, the system control unit 50 determines whether or not the lens unit 300 is connected. When step S1101 is executed at the time power is turned on, determination may be of whether or not the lens unit 300 is connected. The system control unit 50 can perform determination based on whether or not communication via the lens communication unit 92 is possible, an electric potential of a contact point of the lens connection unit 91, and the like, for example.

The system control unit 50, if it is determined that the lens unit 300 is connected, executes step S102, and if it is not determined that the lens unit 300 is connected, repeatedly executes step S1101.

In step S1102, the system control unit 50 acquires lens information through communication with the lens control unit 301. In the lens information, model information of the lens unit or a configurable range of the aperture value may be included. Also, information such as a presence/absence of an APD and a relationship between the F-number and the T-number may be included.

In step S1103, the system control unit 50 determines whether or not the connected lens unit 300 is a lens unit having a transmittance modulation member such as an APD. This determination may be performed based on the lens information or may be performed based on the lens information and information that is stored in advance in the non-volatile memory 56 (e.g., model information of a lens unit having a transmittance modulation member). The system control unit 50, if it is determined that the lens unit 300 is a lens unit having a transmittance modulation member, executes step S1104 and if it is not determined, executes step S105.

In step S1104, the system control unit 50 decides to display the bokeh index item 430. In step S1105, the system control unit 50 decides to not display the bokeh index item 430. The system control unit 50 stores the decision result in steps S1104 and S1105 in the system memory 52, for example, and then reflects it in an operation for controlling a display of the display unit 28.

By virtue of the present embodiment, a display of the bokeh index item 430 can be performed only when a lens unit that needs a display is connected. Accordingly, screen visibility will not be decreased due to unnecessary display. Alternatively, a space for displaying the bokeh index item 430 can be used for other purposes.

Fifth Embodiment

Next, a fifth embodiment will be described. In the previous embodiments, configurations in which blur indices ($\Delta$, $\Delta/\Delta_{MAX}$, and normalized transmittance modulation amount) are used to control a display of the bokeh index item 430 was described. However, blur indices may be used for other purposes. For example, blur indices may be recorded in association when recording image data obtained by shooting. For example, the system control unit 50 can record blur indices as header information and metadata of a data file to store the image data. By this, images whose blurred images are smooth can easily be searched for by searching for image data files whose blur indices have values within a certain range, for example.

Sixth Embodiment

Next, a sixth embodiment will be described. The present embodiment may be the same as the first embodiment except for a form of the bokeh index item and a presentation method thereof, and therefore description regarding a configuration and an operation of an apparatus common to those of the first embodiment will be omitted. Although indices of smoothness of blurred images were presented focusing on the aperture value in the first to fifth embodiments, blurred images change in accordance with a focus distance (distance of a subject on which focus is adjusted). Accordingly, presenting smoothness of blurred images related to the focus distance is useful for the user.

Figure 12A:
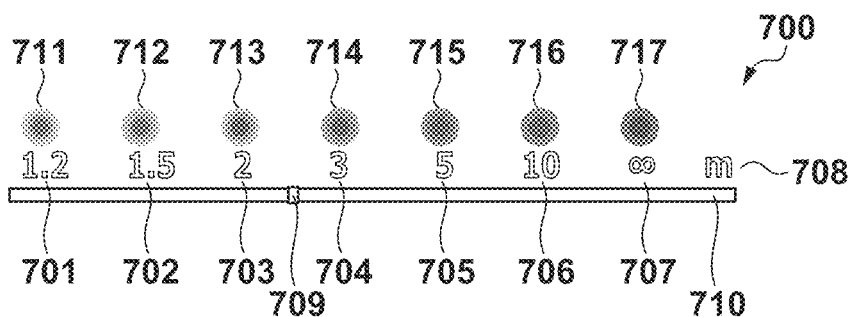
FIG. 12A to FIG. 12C are views illustrating a bokeh index item used in a sixth embodiment and an example of a display.

FIG. 12A is a schematic diagram illustrating an example of a blur comparison item 700 indicating a relationship between a degree of smoothness of a blurred image by the APD 313 and a focus distance. The blur comparison item 700 has a slider item 710, a plurality of distance items 701 to 707, and a plurality of bokeh index items 711 to 717. Note that a positional relationship between each item is not limited to what is illustrated in FIG. 12A. For example, the distance items 701 to 707 may be displayed in a superimposed manner on the slider item 710. Also, the number of distance items may be a desired number greater than or equal to 1.

The linear slider item 710 and the plurality of distance items 701 to 707 that are positioned in a length direction of the slider item 710 in the vicinity of the slider item 710 represent at least a part of a distance range at which the lens unit 300 can be bought into focus. Here, since the distance items denote numerical values, a distance unit item 708 indicating a unit of the numerical values is also displayed. The distance unit item 708 may not necessarily be displayed.

On the slider item 710, an indicator item 709 representing a current focus distance is displayed in a superimposed manner. The current focus distance can be calculated by the system control unit 50 from position information of the focus lenses (front lens group 310).

The plurality of bokeh index items 711 to 717 schematically represent changes in smoothness of blurred images in a distance range that is represented by the slider item 710 and the distance items 701 to 707. Here, the distance items 701 to 707 and the bokeh index items 711 to 717 are displayed in association and smoothness of blurred images at the focus distances represented respectively by the distance items 701 to 707 are indicated by the bokeh index items 711 to 717. However, the number of distance items and bokeh index items may vary and bokeh index items may not necessary be displayed in association with focus distances indicated by the distance items.

The bokeh index items 711 to 717 are circular images schematically representing blurred images of a point light source on which, with regards to discrete focus distances, effects that the focus distances have on blurred images and an effect of the APD 313 were reflected. The user, from the images of the bokeh index items 711 to 717, can specifically and intuitively recognize how smoothness of blurred images will change by changing the focus distance.

The bokeh index items can be generated in advance with regards to a plurality of discrete focus distances and then registered in a non-volatile memory 58 for each model of the lens unit 300, for example. In such a case, the system control unit 50 can refer to the non-volatile memory 58 based on the model information acquired from the lens unit 300 and then acquire bokeh index items to use. Alternatively, the lens unit 300 may store bokeh index items in association with the plurality of discrete focus distances in the ROM 302. The system control unit 50, when acquiring other information from the lens unit 300, can acquire the bokeh index items.

Figure 12B:
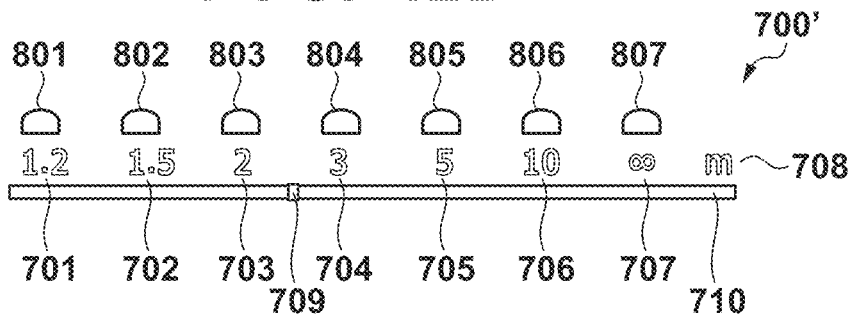

FIG. 12B is a view illustrating another example of a blur comparison item. A blur comparison item 700' is the same as FIG. 12A except for bokeh index items 801 to 807. The bokeh index items 801 to 807 are images resembling shapes of luminance gradients of blurred images related to a point light source. It represents that the closer the shapes are to a rectangle such as the bokeh index item 807, the sharper the luminance gradients around outlines of blurred images are, in other words, the sharper the outlines of the blurred images are. Meanwhile, it represents that the more gradually curved the lines on left and right are as with the bokeh index item 801, the smoother the luminance gradients around outlines of blurred images are, in other words, the smoother the outlines of the blurred images are.

Although the bokeh index items 711 to 717 and 801 and 807 illustrated in FIG. 12A and FIG. 12B are images resembling blurred images related to a point light source, the type of light source is not limited to a point light source. However, the smoothness of blurred images can be recognized most easily in a case of the point light source.

Figure 12C:
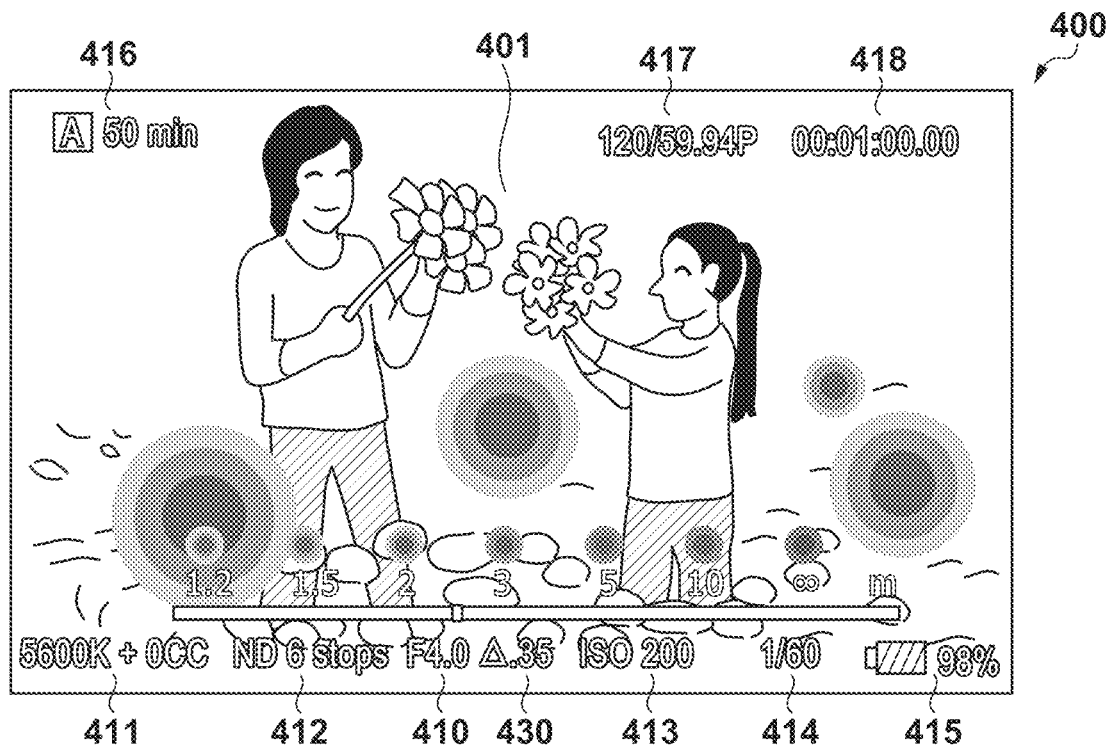

FIG. 12C is a view illustrating an example in which the blur comparison item 700 illustrated in FIG. 12A is displayed in a superimposed manner on the live view screen illustrated in FIG. 6. Configurations that are the same as in FIG. 6 will be given the same reference numerals and redundant descriptions are omitted. The system control unit 50, similarly to other GUI items 411 to 418, can superimpose on the live view image the image of the blur comparison item 700 to display on the display unit 28. The blur comparison item 700 can be displayed in the same manner.

Figure 13:
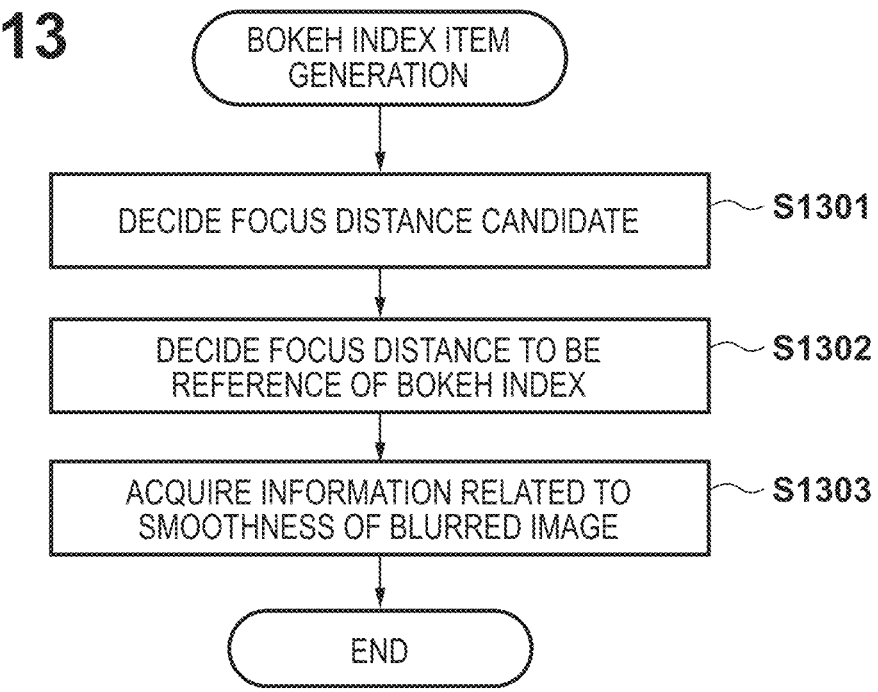
FIG. 13 is a flowchart relating to an operation for generating a bokeh index item in a sixth embodiment.

FIG. 13 is a flowchart relating to an operation, which is executed by the digital camera 100, for generating a bokeh index item. An operation that is indicated in the flowchart in FIG. 13 is realized by a program that is stored in the non-volatile memory 56 being deployed in the system memory 52 and then executed by the system control unit 50. Note that this processing can be executed as part of an operation for a live view display in the digital camera 100.

In step S1301, the system control unit 50 decides to focus distance candidates to display on the blur comparison item. Focus distance candidates can be decided by various methods. For example, the system control unit 50, using a current focus distance as a reference, decides as candidates distances on a short distance end and a long distance end corresponding to a predetermined amount of movement of the focus lens. Then, the system control unit 50 can decide as remaining candidates distances corresponding to focus lens positions which equally divide into a predetermined number of positions between the short distance end and the long distance end of the focus lens positions.

Alternatively, the system control unit 50 may similarly decide focus distance candidates based on an object distance corresponding to an infinite distance and a minimum shooting distance of the lens unit 300, which are acquired by communicating with the lens control unit 301.

Note that a user operation of an input device that is included in the operation unit 70, for example, may be considered in deciding a focus distance. For example, in a case where the user performs an operation for changing the focus distance of the lens unit 300, focus distance candidates may be decided so that the current focus distance is always at the center.

In step S1302, the system control unit 50 decides a focus distance to be a reference of a bokeh index. Reference focus distances can be decided by various methods. For example, the system control unit 50 can present reference distance candidates so as to be selectable on the display unit 28 and then decide the focus distances based on a user selection via an operation of the operation unit 70. Alternatively, the system control unit 50 may decide as a bokeh index reference an object distance corresponding to an infinite distance of the lens unit 300 or a minimum shooting distance.

In step S1303, the system control unit 50 acquires information that relates to smoothness of a blurred image corresponding to the focus distance of the lens unit 300. The information that relates to smoothness of a blurred image can be acquired by various methods. For example, information (e.g., table) in which a plurality of discrete preset focus distances is associated respectively with corresponding smoothness of blurred images is registered in the ROM 302 of the lens unit 300. Then, the system control unit 50 acquires and then stores in the system memory 52 a table from the lens unit 300 through communication with the lens control unit 301. The system control unit 50 can refer to the table within the system memory 52 based on focus distance candidates decided in step S1301 and then acquire information that relates to the smoothness of a blurred image. The acquisition of the table can be carried out at the time the camera 100 is started and/or at the time of detecting attachment of the lens unit 300.

Note that the system control unit 50, instead of acquiring the entire table, may acquire information that relates to the smoothness of blurred images with regards to the focus distance candidates decided in step S101 and the reference focus distance decided in step S1302. The lens control unit 301 may refer to in accordance with a request from the system control unit 50 the table registered in the ROM 302 and acquire from the table and transmit to the system control unit 50 information related to the smoothness of a blurred image, which relates to the focus distance requested from the system control unit 50.

Alternatively, the above table may be associated with identification information of the lens unit 300 and then registered in the non-volatile memory 56. In such a case, the system control unit 50, by referencing the non-volatile memory 56 using identification information of the attached lens unit 300, identifies the table. Then, the system control unit 50 can refer to the table within the system memory 52 based on focus distance candidates decided in step S1301 and then acquire information that relates to the smoothness of a blurred image.

Note that the system control unit 50 may associate with identification information of the lens unit and then save in the non-volatile memory 56 unique information of the lens unit 300 acquired from the lens unit 300 such as information in which the smoothness of a blurred image is associated. By this, in a case where the same lens unit is reconnected, there will be no need to reacquire unique information from the lens unit 300.

The information that relates to the smoothness of a blurred image may be a coefficient of a three-dimensional function expressing a shape of smoothness, a sample value of a curved line expressing a shape of smoothness, a coefficient of a non-linear function, or a one-dimensional index, for example. A type and an expression of a function can be predefined.

The system control unit 50, based on the information acquired in step S1303, causes the image processing unit 24 to generate an image of the blur comparison item 700 or 700'. Then, the system control unit 50, similarly to an image of other image capturing auxiliary information, stores the image generated by the image processing unit 24 in the VRAM region of the memory 32 to cause it to be displayed in a superimposed manner on the live view image.

As described above, in the present embodiment, a configuration is taken so as to present an index indicating the smoothness of a blurred image in the captured image obtained by the current image capture condition for a plurality of different focus distances. Accordingly, it is possible for the user to easily recognize, prior to shooting, the smoothness of a blurred image, which changes in accordance with a distance of a subject on which to focus. Accordingly, it is possible for the user to change the focus distance so as to obtain the desired blurred image.

Seventh Embodiment

Next, a seventh embodiment will be described. As illustrated in FIG. 4B, a blur effect by the transmittance modulation member increases when the aperture value is full-open or is in a range close thereto. Meanwhile, in a case where the aperture value is full-open or in a range close thereto, a depth of field decreases. Accordingly, by changing the aperture value to a full-open side, a desired subject may move out of the depth of field and in such a case, focus distance readjustment becomes necessary. Further, when the aperture value is changed to a full-open side, the amount of incident light also increases and in order to maintain the same exposure amount from before the change, other image capture conditions such as shutter speed and sensitivity need to be changed.

However, because the transmittance modulation member is present, the change amount (number of stages) of the aperture value does not immediately take on the change amount of another image capture condition. Accordingly, when the aperture value is changed, it is difficult to recognize an amount of correction of another image capture condition that is necessary for maintaining the exposure amount from before the change.

As described above, even if the user wants to confirm a blur effect of when the aperture value is changed, because there are other elements to be adjusted in addition to the aperture value, the blur effect cannot be easily confirmed. The present embodiment makes it possible to easily confirm the blur effect when the aperture value is changed. The present embodiment may be the same as the first embodiment except for the method for presenting the bokeh index item form, and therefore description regarding a configuration and an operation of an apparatus common to those of the first embodiment will be omitted.

Figure 14:
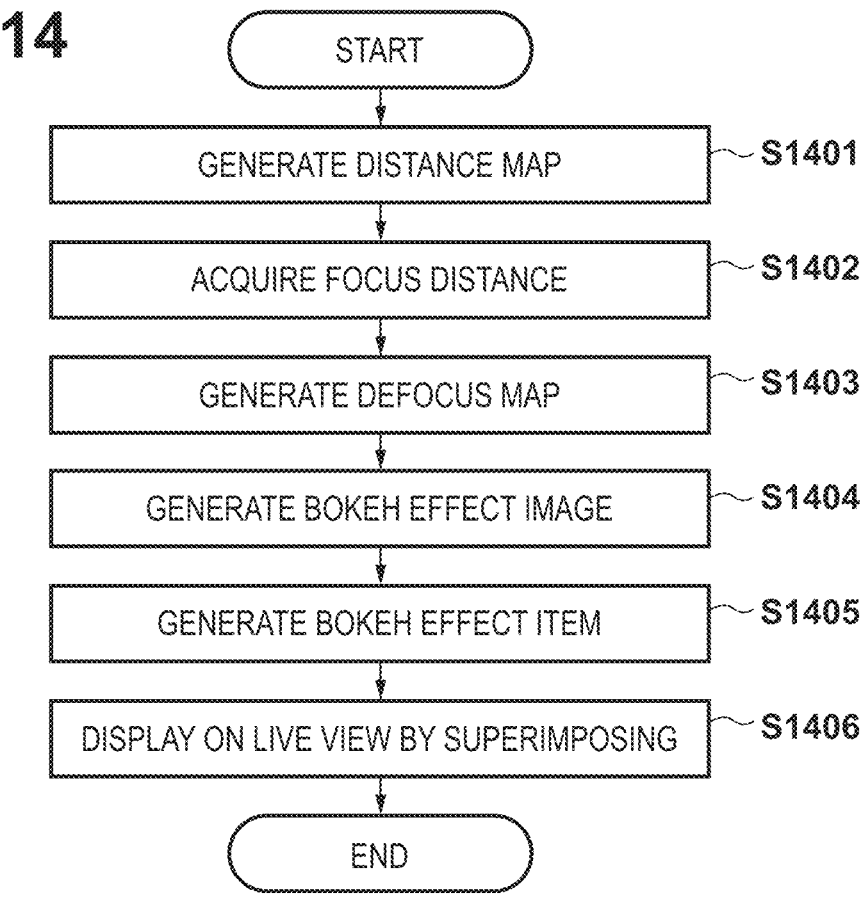
FIG. 14 is a flowchart relating to an operation for generating a blur effect in a seventh embodiment.

FIG. 14 is a flowchart relating to an operation for generating and presenting a bokeh index executed by the system control unit 50 in the present embodiment. An operation that is indicated in the flowchart in FIG. 14 is realized by a program that is stored in the non-volatile memory 56 being deployed in the system memory 52 and then executed by the system control unit 50. Note that this operation can be executed as part of an operation for a live view display in the digital camera 100.

In step S1401, the system control unit 50 generates a distance map. The distance map is also called a range image or a depth map and has a form of a two-dimensional image in which a value of each pixel expresses distance information. The distance map can be generated by a desired known method and the present embodiment is not dependent on the method of generating the distance map. For example, in a case where an image capturing element included in the image capturing unit 22 has a configuration in which a pair of parallax images can be generated in a single shot, an object distance in each pixel can be obtained based on a defocus amount of corresponding pixels of the parallax image. Also the object distance in each pixel may be obtained based on a focusing lens position at which a contrast of each pixel is the greatest. Alternatively, a distance sensor of a ToF method may be used. Note that the distance map may be generated by the image processing unit 24 in accordance with control of the system control unit 50.

In step S1402, the system control unit 50 acquires the focus lens position information and the focal length information of the lens unit 300 from the lens control unit 301. Then, the system control unit 50, based on the acquired information, calculates the current focus distance of the lens unit 300.

In step S1403 the system control unit 50 calculates a defocus amount in each pixel from the calculated focus distance and the distance map generated in step S1401. By this, the system control unit 50 generates a defocus map in which each pixel value indicates the defocus amount. Note that although the defocus map was generated from the distance map and the current focus distance in the present embodiment, the defocus map may be generated by another method. For example, in a case where each pixel of the image capturing element included in the image capturing unit 22 has a configuration that doubles as the phase difference detection pixel, the defocus amount at each pixel position can be obtained directly. In such a case, generation of a distance map and calculation of the current focus distance are unnecessary.

When changing from an aperture value (e.g., approximately F4.0) whose blur effect by the APD 313 is small to an aperture value (e.g., full-open aperture F2.2) whose blur effect is great, the depth of field decreases, and therefore, pixels outside the depth of field increase the defocus amount.

When the defocus amount increases, spreading of an image occurs. Although this spreading of the image depends on the intensity of the image and the magnitude of the defocus amount, it may generally be regulated by a point spread function (PSF). Accordingly, even if the aperture value is not changed by driving the diaphragm 312, it is possible to generate a blur effect image simulating what kind of an effect the change in the defocus amount will have on the image of each pixel when the aperture value is changed.

Note that a known PSF can be used for the simulation. For example, there are known PSFs such a PSF that is approximated by a two-dimensional Gaussian function regulated in an ideal optical system, a PSF in which a Fourier transform taking into account an aberration of the optical system is used, and a PSF taking into account an effect on an image by diffraction phenomenon using Huygens principle.

Figure 15A:
FIG. 15A to FIG. 15C are schematic diagrams of blur effect image generation in the seventh embodiment.
Figure 15B:
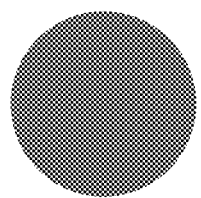

In step S1404, the system control unit 50 generates a blur effect image. FIG. 15A is a schematic diagram illustrating an example of spreading of a point light source of an aperture value (e.g., approximately F4.0) whose blur effect is small. FIG. 15B is a schematic diagram illustrating a result of simulating, using the image illustrated in FIG. 15A and a PSF, the spreading of an image when an aperture value (e.g., full-open aperture F2.2) whose blur effect is great is changed.

Figure 15C:
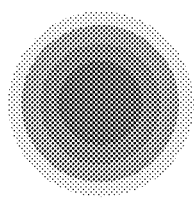

In the present embodiment, an effect for smoothening an outline portion of a blurred image by the APD 313 is provided, and accordingly, by providing the effect of the APD 313 in relation to an image illustrated in FIG. 15B, a blur effect image is obtained. The effect of the APD 313 is caused by the relationship between the pupil radius and transmittance illustrated in FIG. 4A. Accordingly, the image illustrated in FIG. 15C can be obtained by providing the effect of the APD 313 in relation to the image in FIG. 15B from the relationship between the pupil radius and transmittance illustrated in FIG. 4A.

The relationship between the pupil radius and transmittance of the APD 313 can be stored in the ROM 302 of the lens unit 300. The relationship between the pupil radius and transmittance may be stored as a function or a combination of the pupil radius and transmittance may be stored with regards to a plurality of discrete pupil radii. The system control unit 50 acquires through communication with the lens control unit 301 and then stores in the system memory 52 information regarding the relationship between the pupil radius and transmittance of the APD 313.

The system control unit 50, by causing the image processing unit 24 to apply the effect by the APD 313 after applying a PSF on each pixel of the live view image, for example, generates a blur effect image corresponding to a post-change aperture value.

In step S1405, the system control unit 50 generates a blur effect item. The system control unit 50 extracts an image of difference between the blur effect image generated in step S1404 and the original image of the blur effect image, for example. This difference image corresponds to a region to be changed by changing the aperture value. Accordingly, the system control unit 50 generates the blur comparison item based on the difference image. The system control unit 50 may configure the blur comparison item by converting the difference image to a certain color, for example.

Figure 16A:
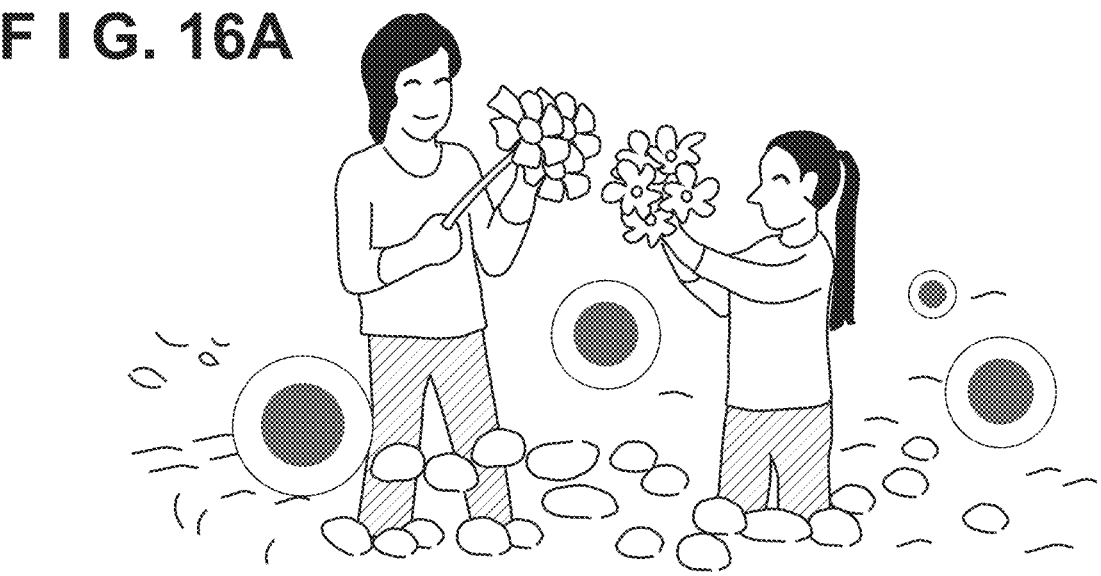
FIG. 16A and FIG. 16B are views illustrating examples of methods for presenting to a user blur effects in the seventh embodiment.

FIG. 16A is a view illustrating an example in which the image of difference between the original image and the blur effect image is converted to a certain color and then is displayed in a superimposed manner on the original image as a blur effect item. In FIG. 16A, an example in which a blur effect image at a full-open aperture in which a blur effect is the greatest is generated and then an image of difference from the original image is generated is illustrated.

Figure 16B:
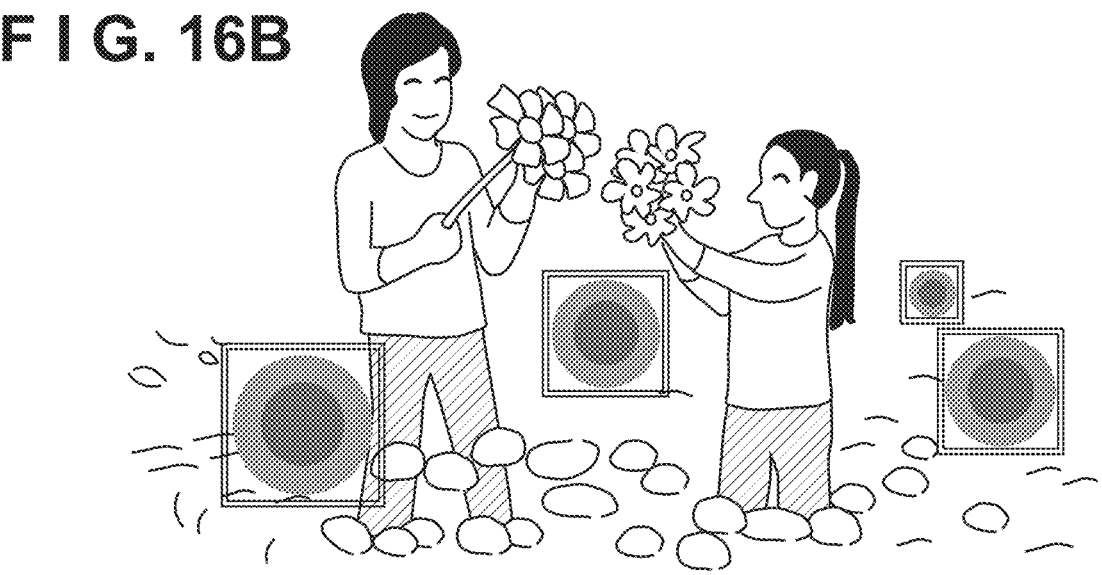

FIG. 16B is a view illustrating an example of indices for emphasizing regions of difference between the original image and the blur effect image in which frame-shaped indices surrounding corresponding regions are generated as blur effect items and then are displayed in a superimposed manner. The regions of difference from the original image may be regions indicating difference in the magnitudes of blurred images or may be regions in which the difference in pixel values are greater than or equal to a threshold value.

Also, where to display the frame-shaped blur effect items may be on only a region of difference in which a difference in magnitudes or values are the greatest or may be on all regions of difference in which a degree of difference is greater than or equal to a constant. Also, a display style of the blur effect item may be varied in accordance with the degree of difference. Also, the display style is not limited to the method illustrated in the view.

Figure 17:
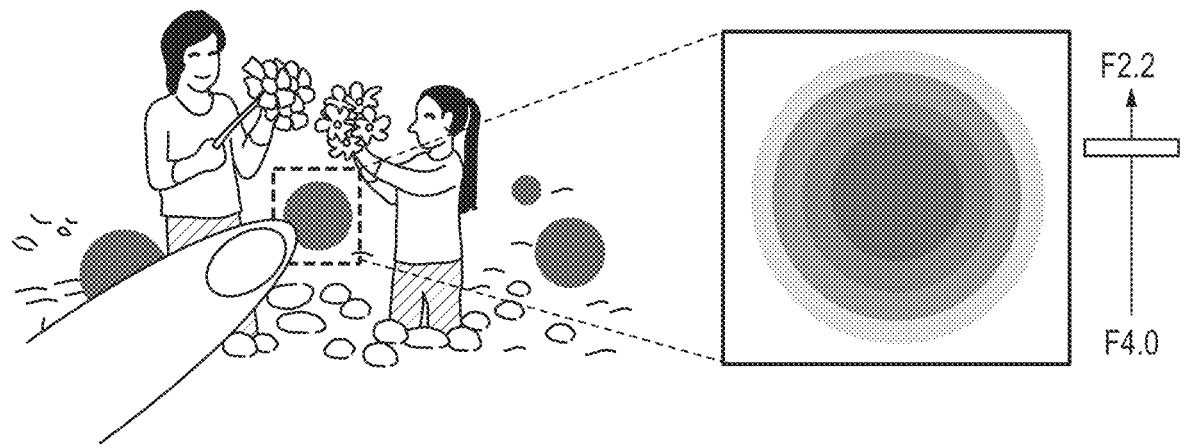
FIG. 17 is a view illustrating an example of a method for presenting to a user blur effects in the seventh embodiment.

Because the magnitude and fineness of the blur effect depends greatly on a subject and a region, as illustrated in FIG. 17, a configuration may be taken so that the user can specify by a touch operation on the display unit 28 a region for which to confirm the blur effect. In such a case, the system control unit 50 may generate blur effect images for the entire live view image or may generate a blur effect image only for the specified region.

In a case where the blur effect image is generated only for the specified region, the blur effect image may be displayed to be magnified as illustrated in FIG. 17. Also, configuring so that the user can specify the aperture value for when the blur effect image is generated so that he/she can easily confirm in detail the blur effect due to the change in the aperture value is effective. In the example in FIG. 17, an example in which after specifying a region, the aperture value is configured to be continuously changeable by a slide operation on the display unit 28 is illustrated. By this, the user can easily specify the aperture value for obtaining a desired blur effect.

Note that in the above-described example, a configuration in which an effect by the APD was applied after applying the PSF was described. However, because the original image is subjected to an effect of the APD, a certain degree of a blur effect is obtained by applying the PSF. Accordingly, applying the effect by the APD after applying the PSF is not necessary.

As described above, in the seventh embodiment, a configuration is taken so that a blur effect image representing a blur effect that is obtained in a case where the aperture value is changed is generated using the point spread function and a characteristic of the APD and a blur effect item based on the blur effect image is presented. Accordingly, it is possible to accurately confirm a blur effect that is obtained at a post-change aperture value without actually changing the aperture value.

By virtue of the present invention, it is possible to provide a display control apparatus, in which a user can easily recognize "taste of bokeh" of a captured image before it is recorded, and a method for controlling the same.

Other Embodiments

In the above-described first to fifth embodiments, a bokeh index was obtained by using a difference or an amount of variance A in the T-number for the same F-number between a case where there is an APD and a case where there is no APD. However, the bokeh index may be obtained using a difference or an amount of variance between the F-number and the T-number for the F-number, between a case where there is an APD and a case where there is no APD. This is because the difference between the F-number in a case where there is no APD and the T-number corresponding to the F-number does not depend on the F-number.

In other words, in a case where there is an APD, a difference between a certain F-number and a T-number corresponding to that F-number will be a sum total of the difference that is present even when there is no APD and the difference caused by there being an APD. Because the difference that is present also in a case where there is no APD is not dependent on the F-number, in a case where there is an APD, the change in the difference between a certain F-number and a T-number corresponding to that F-number reflects the change in the difference that is caused by there being an APD. Accordingly, a value that can be used as a bokeh index is obtained even when using the maximum value of the difference between the F-number and the corresponding T-number as $\Delta_{MAX}$ and the difference between the current F-number and the corresponding T-number as $\Delta$.

Note that an operation described in the present specification to be performed by the system control unit 50 may be realized by a single piece of hardware or by dividing the processes among a plurality of pieces of hardware.

Also, although the present invention was explained in detail above based on exemplary embodiments thereof, the present invention is not limited to these specific embodiments, and various forms of a scope that does not deviate from the gist of this invention are included in the invention. Further, each of the above-described embodiments can be combined as appropriate in a scope without an obstructive factor.

Also, in the above-described embodiments, description was given using, as an example, a case where the present invention was applied in a digital camera. However, the present invention can be implemented in a desired electronic device that is capable of acquiring shooting lens information. Such an electronic device includes an electronic device comprising an image capture apparatus and an electronic device as an external apparatus that is capable of communicating with an image capture apparatus. Such an electronic device includes a personal computer, a personal digital assistant (PDA), a mobile telephone terminal, a media player, a printer apparatus comprising a display, a digital photo frame, and a game device. Also, the present invention can be implemented in an electronic book reader, a tablet terminal, a projection device, a consumer appliance and an in-vehicle apparatus comprising a display, and the like.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-019130, filed on Feb. 6, 2020, and No. 2020-189786, filed on Nov. 13, 2020, which are hereby incorporated by reference herein in their entirety.

What is claimed is:

1. A display control apparatus comprising:
one or more processors, when executing a program stored, function as:
a setting unit configured to be able to set at least a setting value of either one of an F-number, a T-number and a value relating to a focus distance;
an acquisition unit configured to be able to acquire information that relates to a degree of bokeh that changes based on the setting value set by the setting unit; and
a control unit configured to control so as to display the information corresponding to a current setting value acquired by the acquisition unit,
wherein the control unit configured to control so as to:
in a case where a predetermined lens is connected to a camera, display the information acquired by the acquisition unit; and
in a case where the predetermined lens is not connected to a camera, not display the information.

2. The display control apparatus according to claim 1, wherein
the control unit configured to control so as to display, together with a first item that indicates the setting value set by the setting unit, a second item that indicates the information corresponding to a current setting value acquired by the acquisition unit.

3. The display control apparatus according to claim 1, wherein the acquisition unit acquires a table that indicates a correspondence of an F-number and a T-number.

4. The display control apparatus according to claim 3, wherein the table is changed in accordance with a focus distance.

5. The display control apparatus according to claim 1, wherein the acquisition unit acquires, as the information that relates to the degree of bokeh, a difference between an F-number and a T-number for a current setting value or a proportion of the difference in relation to a maximum value of the difference.

6. The display control apparatus according to claim 1, wherein the control unit displays as the degree of bokeh a numerical value that was acquired as the information that relates to the degree of bokeh.

7. The display control apparatus according to claim 1, wherein the control unit causes the information that relates to the degree of bokeh to be displayed on the live view screen.

8. The display control apparatus according to claim 1, wherein the setting unit is configured to set a setting value of the value relating to the focus distance.

9. The display control apparatus according to claim 8, wherein the acquisition unit acquires a table that indicates information that relates to a degree of bokeh that changes based on a focus distance.

10. The display control apparatus according to claim 8, wherein the acquisition unit acquires a table that indicates information that relates to a degree of bokeh that changes based on an F-number and a focus distance.

11. The display control apparatus according to claim 8, wherein the control unit displays the information from when a setting of a focus distance of a lens is changed until a predetermined length of time has elapsed, and stops display of the information when the predetermined length of time has elapsed.

12. A method for controlling a display control apparatus, the method comprising:
   acquiring, a bokeh index in a captured image based on a T-number that corresponds to a current F-number of a lens unit; and
   controlling to cause a display, on a display unit, of an item that expresses the bokeh index.

13. A non-transitory computer-readable storage medium storing a program for causing a computer to execute a method for controlling a display control apparatus, the method comprising:
   acquiring a bokeh index in a captured image based on a T-number that corresponds to a current F-number of a lens unit; and
   controlling to cause a display, on a display unit, of an item that expresses the bokeh index.

14. A method for controlling a display control apparatus, the method comprising:
   setting at least a setting value of either one of an F-number, a T-number and a value relating to a focus distance;
   acquiring information that relates to a degree of bokeh that changes based on the setting value set by the setting; and
   controlling so as to display the information corresponding to a current setting value acquired by the acquiring,
   wherein the controlling comprises:
   controlling, in a case where a predetermined lens is connected to a camera, so as to display the information acquired by the acquisition unit; and
   controlling, in a case where the predetermined lens is not connected to a camera, so as not to display the information.

15. A non-transitory computer-readable storage medium storing a program for causing a computer to execute a method for controlling a display control apparatus, the method comprising:
   setting at least a setting value of either one of an F-number, a T-number and a value relating to a focus distance;
   acquiring information that relates to a degree of bokeh that changes based on the setting value set by the setting; and
   controlling so as to display the information corresponding to a current setting value acquired by the acquiring,
   wherein the controlling comprises:
   controlling, in a case where a predetermined lens is connected to a camera, so as to display the information acquired by the acquisition unit; and
   controlling, in a case where the predetermined lens is not connected to a camera, so as not to display the information.

* * * * *